United States Patent
Lindsay

(10) Patent No.: US 10,250,058 B2
(45) Date of Patent: Apr. 2, 2019

(54) CHARGE MANAGEMENT SYSTEM

(71) Applicant: Raytheon Company, Waltham, MA (US)

(72) Inventor: Bruce J. Lindsay, San Clemente, CA (US)

(73) Assignee: Raytheon Company, Waltham, MA (US)

( * ) Notice: Subject to any disclaimer, the term of this patent is extended or adjusted under 35 U.S.C. 154(b) by 142 days.

(21) Appl. No.: 15/266,531

(22) Filed: Sep. 15, 2016

(65) Prior Publication Data

US 2018/0076646 A1    Mar. 15, 2018

(51) Int. Cl.
| | | |
|---|---|---|
| H02J 7/00 | (2006.01) |
| G05F 1/56 | (2006.01) |
| H02H 9/00 | (2006.01) |
| H02M 3/07 | (2006.01) |

(52) U.S. Cl.
CPC .......... *H02J 7/0068* (2013.01); *G05F 1/56* (2013.01); *H02H 9/00* (2013.01); *H02H 9/002* (2013.01); *H02M 3/07* (2013.01)

(58) Field of Classification Search
CPC ............ H02J 7/0068; G05F 1/56; H02H 9/00; H02M 3/07
USPC .................. 320/128, 134, 135, 159, 164
See application file for complete search history.

(56) References Cited

U.S. PATENT DOCUMENTS

| | | | | |
|---|---|---|---|---|
| 3,601,683 A | * | 8/1971 | Brown ............... | H02M 7/5157 363/138 |
| 4,654,769 A | * | 3/1987 | Middlebrook ....... | H02M 3/158 363/16 |
| 4,903,182 A | * | 2/1990 | Pilukaitis ........... | H02M 3/3385 323/289 |
| 5,420,780 A | | 5/1995 | Bernstein et al. | |

(Continued)

FOREIGN PATENT DOCUMENTS

| | | |
|---|---|---|
| GB | 2369458 | 5/2002 |
| WO | 2006016002 | 2/2006 |
| WO | 2008000981 | 1/2008 |

OTHER PUBLICATIONS

International Search Report and Written Opinion of the International Searching Authority for Corresponding International Application PCT/US2017/030502 dated Sep. 7, 2017.

*Primary Examiner* — Phallaka Kik
(74) *Attorney, Agent, or Firm* — Renner Otto

(57) ABSTRACT

A charge management system including a power distribution bus circuit for distributing energy from a power source to a load, and an intermediate energy storage circuit operably connected to a power distribution bus circuit for aiding in distribution of energy to the load. A charge management system controller may be configured to control the discharge of energy between the intermediate storage circuit and the power distribution bus circuit during one or more modes. Such a charge management system may enable the power distribution bus circuit to receive energy from the intermediate energy storage circuit before the power bus voltage (Continued)

drops in response to load demand, which may enable the power source to respond to perturbations in the power bus voltage and minimize inrush current from the power source. The system also may be used to soft-start high-power equipment, or absorb energy spikes associated with shutdown of such high-power equipment.

20 Claims, 13 Drawing Sheets

(56) References Cited

U.S. PATENT DOCUMENTS

| | | | | |
|---|---|---|---|---|
| 5,587,894 | A * | 12/1996 | Naruo | H02M 1/4208 363/44 |
| 5,714,863 | A | 2/1998 | Hwang et al. | |
| 6,678,175 | B1 * | 1/2004 | Ferencz | H02M 3/337 323/288 |
| 7,952,223 | B2 | 5/2011 | Masson et al. | |
| 10,148,095 | B2 * | 12/2018 | Leinonen | H02J 4/00 |
| 2007/0194759 | A1 * | 8/2007 | Shimizu | H02J 7/0016 320/166 |
| 2011/0215654 | A1 * | 9/2011 | Kumar | H02M 3/06 307/109 |
| 2012/0262121 | A1 * | 10/2012 | Kuo | H02J 7/0018 320/126 |
| 2012/0320649 | A1 * | 12/2012 | Hamanaka | H02M 7/48 363/131 |
| 2013/0033914 | A1 * | 2/2013 | Yahata | H02M 7/48 363/132 |
| 2013/0264868 | A1 * | 10/2013 | Higaki | H02J 7/345 307/10.1 |
| 2013/0285582 | A1 * | 10/2013 | Ohashi | H02M 3/1582 318/377 |
| 2013/0314061 | A1 * | 11/2013 | Forghani-zadeh | G05F 1/46 323/271 |
| 2014/0253138 | A1 * | 9/2014 | Ishii | H02H 3/16 324/509 |
| 2016/0285273 | A1 * | 9/2016 | Leinonen | H02J 3/1842 |
| 2018/0294672 | A1 * | 10/2018 | Zhong | H02J 7/025 |

* cited by examiner

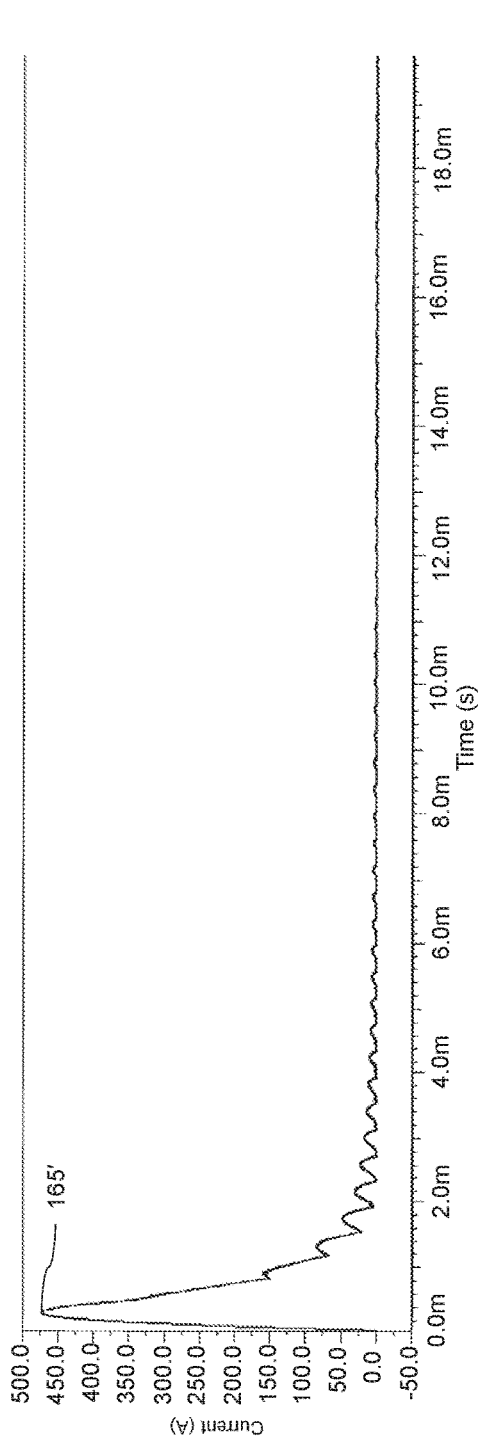
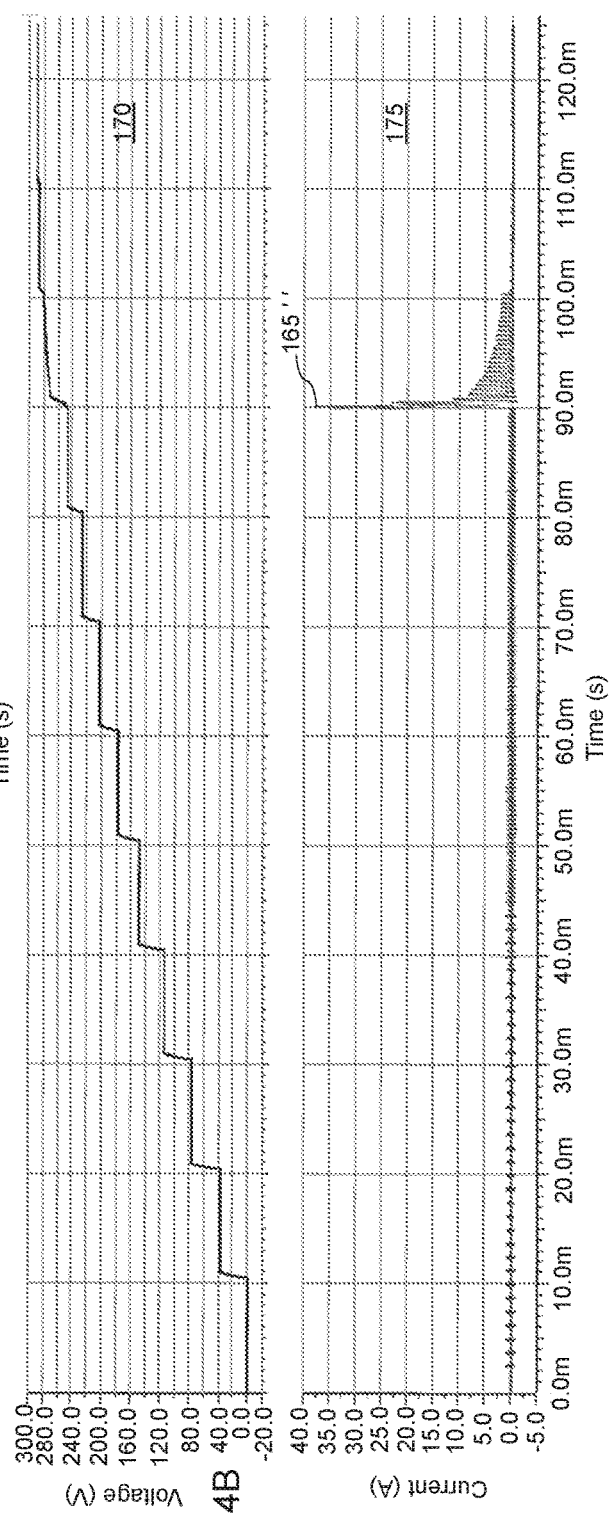
FIG. 4A
FIG. 4B

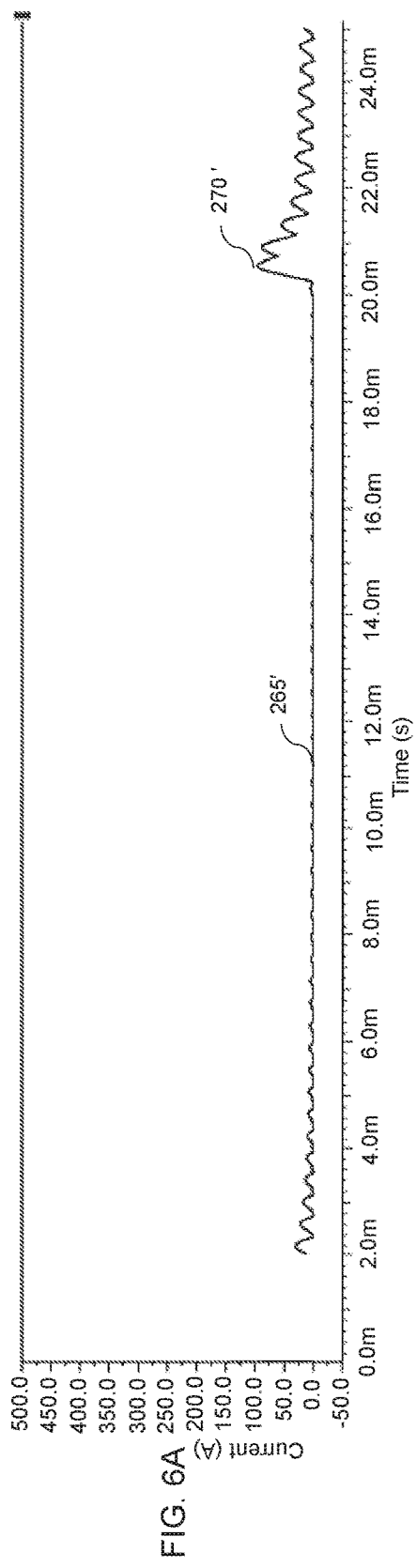
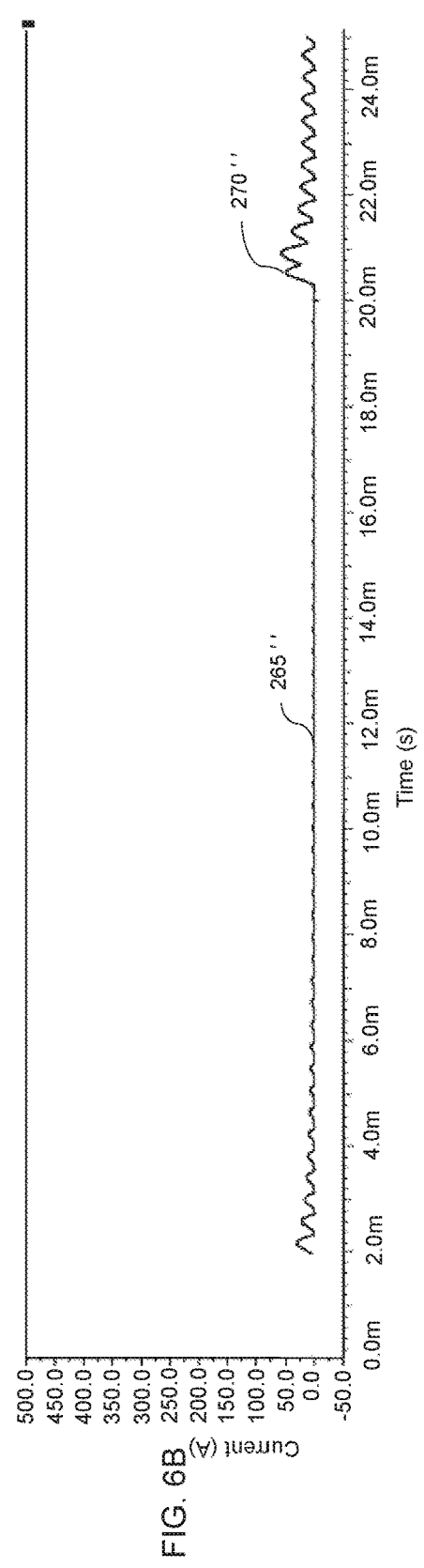

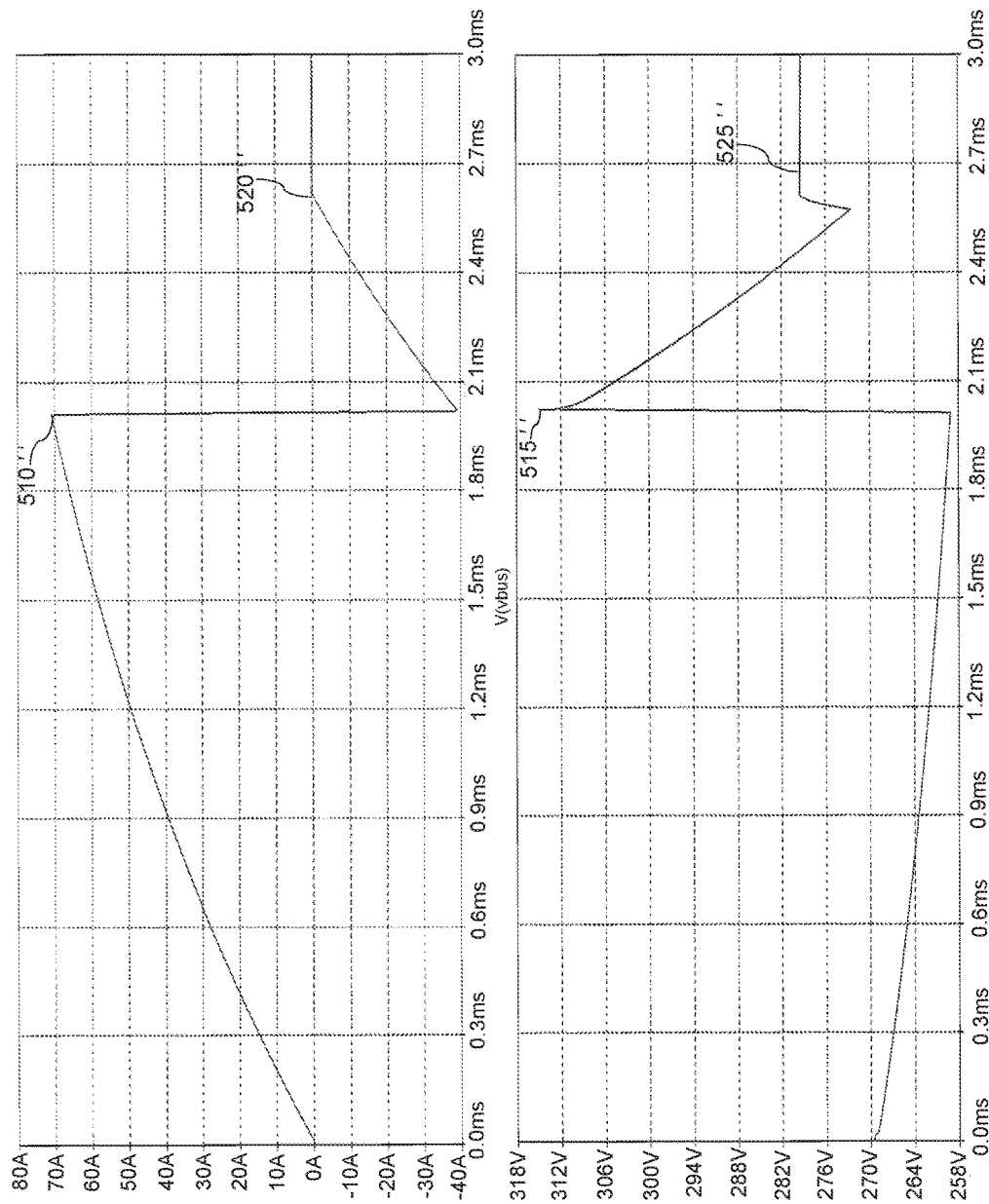

CHARGE MANAGEMENT SYSTEM

FIELD OF INVENTION

The present invention relates generally to power control circuitry, and more particularly to a charge management system for improving the delivery of power from an energy source.

BACKGROUND

Many applications that use electronic devices or electro-mechanical equipment, such as electric motors or high pulse current electronic equipment, typically demand high-power output from a power supply. In such systems, a circuit is typically designed to deliver power from the power supply to the equipment load, and capacitors are typically used to limit voltage drops as the power is supplied. However, during operation or startup of such high-power equipment, the load may change, sometimes rapidly, thereby demanding a large amount of current to be delivered to the load. In these situations, the inrush current demanded from the power supply can be relatively high, which may result in damage to the circuit, the electromechanical equipment, and/or the power supply. Such high inrush current also may generate electromagnetic interference, which may cause problems with the performance of the electromechanical equipment.

SUMMARY OF INVENTION

The power delivery circuits of the type described above typically attempt to address such problems of power disturbance by either increasing the amount of capacitance in the circuit, which may be heavy and bulky, or by the use of control circuitry that reduces the performance of the equipment during the startup period.

The present disclosure provides, inter alia, a charge management system that enables sufficient energy to be distributed from the power supply to the load, while minimizing power disturbance and peak current draws on the power supply. More particularly, the charge management system may include an intermediate energy storage circuit that is configured to operate as a bridge for aiding in the distribution of energy during the operation of such high-power delivery circuits.

For example, the charge management system may be configured such that the intermediate energy storage circuit stores energy over a relatively long period of time, which can then be discharged into a power distribution bus circuit when desired.

The charge management system may also include a charge management controller that may be configured to control the discharge of energy from the intermediate storage circuit to the power distribution bus circuit by measuring current out of the power bus circuit over a gated period of time.

The intermediate energy storage circuit may include a discharge switch operably coupled to the charge management controller for controlling the amount of charge that is distributed from the intermediate energy storage circuit to the power bus circuit.

Such a charge management system may enable the power distribution bus circuit to receive energy from the intermediate energy storage circuit before the power bus voltage drops in response to load demand. In this manner, the charge management system may enable the primary power source to respond to perturbations in the power bus voltage, which can minimize inrush current from the primary power source.

For example, when load current demand is increased, the charge management system may enable an instantaneous transfer of energy from the intermediate energy storage circuit to the power distribution bus circuit, such that output voltage is increased and the undershoot of current being sourced from the power supply is reduced. For alternating current systems that have a boost topology power factor correction, the effect of right hand plane zeroes may thereby be reduced.

In addition, during operation of devices or equipment using the charge management system, the energy stored by the intermediate energy storage circuit may be sufficient to allow such equipment to smoothly ramp up to steady state operation without having excessively high load applied to the output of the power bus circuit. This may be done without an isolation transformer which is usually used for this purpose.

Such a charge management system may also enable force power sharing between multiple sources of energy storage while minimizing or eliminating destabilization of the power distribution bus.

The charge management system may also enable the storage of regenerative energy into the intermediate energy storage circuit from the power distribution bus circuit when the voltage across the power distribution bus circuit is beyond a predetermined level.

The intermediate energy storage circuit may include a capture charge switch operably coupled to the charge management controller for controlling the amount of charge that is distributed from the power distribution bus circuit to the intermediate energy storage circuit.

The intermediate energy storage circuit also may be utilized to soft-start devices or equipment, particularly equipment with large amounts of capacitance across their line input. This may be accomplished without the need for dissipative resistors across input relays of the charge management system.

The charge management system also may be used to absorb energy spikes associated with the shut-down of such high-power equipment.

According to one aspect of the invention, a method of operating a charge management system for distributing power from a power source to a load, the charge management system including a power distribution bus circuit operably connected to the power source and the load, and an intermediate energy storage circuit operably connected to the power distribution bus circuit, the method including: (i) charging at least one energy storage capacitor in the intermediate energy storage circuit; (ii) activating a discharge switch to operably connect the at least one energy storage capacitor to at least one power bus capacitor in the power distribution bus circuit, thereby discharging at least some energy stored in the energy storage capacitor to the at least one power bus capacitor; (iii) deactivating the discharge switch to operably disconnect the at least one energy storage capacitor from the at least one power bus capacitor; and (iv) determining whether voltage across the at least one power bus capacitor is within a predetermined range; wherein, when voltage across the at least one power bus capacitor is not within the predetermined range during the determining, then repeating steps (i) through (iv); and wherein, when voltage across the at least one power bus capacitor is within the predetermined range during the determining, then operably connecting the power source to the load.

According to another aspect of the invention, a method of operating a charge management system for distributing power from a power source to a load, the charge management system including a power distribution bus circuit operably connected to the power source and the load, and an intermediate energy storage circuit operably connected to the power distribution bus circuit, the method including: (i) operably connecting the power source to the load; (ii) charging at least one energy storage capacitor in the intermediate energy storage circuit; (iii) determining load current demand, and based upon a determination that the load demands current that meets or exceeds a predetermined level, activating a discharge switch to operably connect the at least one energy storage capacitor in the intermediate energy storage circuit to at least one power bus capacitor in the power distribution bus circuit, thereby discharging at least some energy stored in the energy storage capacitor and at least some energy stored in the power bus capacitor to the load; (iv) deactivating the discharge switch to operably disconnect the at least one energy storage capacitor from the at least one power bus capacitor; and (v) repeating steps (ii) through (iv).

According to another aspect of the invention, a method of operating a charge management system for distributing power from a power source to a load, the charge management system including a power distribution bus circuit operably connected to the power source and the load, and an intermediate energy storage circuit operably connected to the power distribution bus circuit, the method including: (i) determining voltage across at least one a power bus capacitor in the power distribution bus circuit, and based upon a determination that the voltage across the at least one power bus capacitor is greater than a predetermined level, activating a capture charge switch to operably connect the at least one power bus capacitor to at least one energy storage capacitor in the intermediate energy storage circuit, thereby discharging at least some energy stored in the at least one power bus capacitor to the at least one energy storage capacitor; (ii) deactivating the capture charge switch to operably disconnect the at least one power bus capacitor from the at least one energy storage capacitor; (iii) further charging the at least one energy storage capacitor in the intermediate energy storage circuit based upon a determination that the voltage across the at least one energy storage capacitor is below a predetermined level; (iii) determining load current demand, and based upon a determination that the load demands current that meets or exceeds a predetermined level, activating a discharge switch to operably connect the at least one energy storage capacitor to the at least one power bus capacitor, thereby discharging at least some energy stored in the energy storage capacitor and at least some energy stored in the power bus capacitor to the load; and (iv) deactivating the discharge switch to operably disconnect the at least one energy storage capacitor from the at least one power bus capacitor.

According to another aspect of the invention, a charge management system for distributing power from a power source to a load via a power distribution bus circuit having at least one power bus capacitor, the charge management system includes: an intermediate energy storage circuit operably connected to the power distribution bus circuit, the intermediate energy storage circuit having at least one energy storage capacitor, and at least one discharge switch configured to operably connect or disconnect the at least one energy storage capacitor to or from the at least one power bus capacitor; and a system controller operably connected to the power bus distribution circuit and the intermediate energy storage circuit.

In a start-up mode, the system controller may be configured to: (i) activate an energy storage capacitor charge switch to operably connect the at least one energy storage capacitor to at least one energy source, thereby enabling charging of the at least one energy storage capacitor; (ii) activate a discharge switch to operably connect the at least one energy storage capacitor to the at least one power bus capacitor, thereby enabling discharging of at least some energy stored in the energy storage capacitor to the at least one power bus capacitor; (iii) deactivate the discharge switch to operably disconnect the at least one energy storage capacitor from the at least one power bus capacitor; and (iv) determine whether the voltage across the at least one power bus capacitor is within a predetermined range, such that, based upon a determination that the voltage across the at least one power bus capacitor is not within the predetermined range, the controller is configured to repeat steps (i) through (iv), and based upon a determination that the voltage across the at least one power bus capacitor is within the predetermined range during the determining, the controller is configured to activate a power relay switch to operably connect the power source to the load.

In an operational mode, the system controller may be configured to: (i) operably connect the power source to the load; (ii) determine whether the voltage across the at least one energy storage capacitor is at or above a predetermined level, and based upon a determination that the voltage across the energy storage capacitor is below the predetermined level, the controller is configured to activate the energy storage capacitor charge switch to operably connect the at least one energy storage capacitor to the at least one energy source, thereby enabling charging of the at least one energy storage capacitor; (iii) determine load current demand, and based upon a determination that the load demands current that meets or exceeds a predetermined level, activating the discharge switch to operably connect the at least one energy storage capacitor to the at least one power bus capacitor, thereby enabling discharging of at least some energy stored in the energy storage capacitor and at least some energy stored in the power bus capacitor to the load; and (iv) deactivating the discharge switch to operably disconnect the at least one energy storage capacitor from the at least one power bus capacitor.

In a regenerative mode, the controller may be configured to determine voltage across the at least one a power bus capacitor, and based upon a determination that the voltage across the at least one power bus capacitor is greater than a predetermined level, the controller is configured to activate a capture charge switch to operably connect the at least one power bus capacitor to the at least one energy storage capacitor, thereby enabling discharging of at least some energy stored in the at least one power bus capacitor to the at least one energy storage capacitor.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 4A is an x-y plot diagram illustrating a simulation of a start-up mode according to a system that does not use the charge management system in FIG. 1.

FIG. 4B is an x-y plot diagram illustrating an exemplary simulation of a start-up mode using the charge management system in FIG. 1.

FIG. 6A is an x-y plot diagram illustrating a simulation of an operational mode according to a system that does not use the charge management system in FIG. 1.

FIG. 6B is an x-y plot diagram illustrating an exemplary simulation of an operational mode using the charge management system in FIG. 1.

FIGS. 11A and 11B are x-y plot diagrams illustrating an exemplary simulation of a shut-down mode using the charge management system in FIG. 1.

DETAILED DESCRIPTION

The principles of the present invention have particular application for high-power devices or equipment, such as electric motors, radars, Lidars, electronic warfare systems, pulsed radio frequency high-power directed energy weapons, or the like, and will thus be described below chiefly in this context. It is also understood, however, that principles of this invention may be applicable to other systems or applications where it is desirable to provide a charge management system that enables sufficient energy to be distributed from a power supply to a load while minimizing power disturbance and peak current draws on the power supply.

Figure 1:
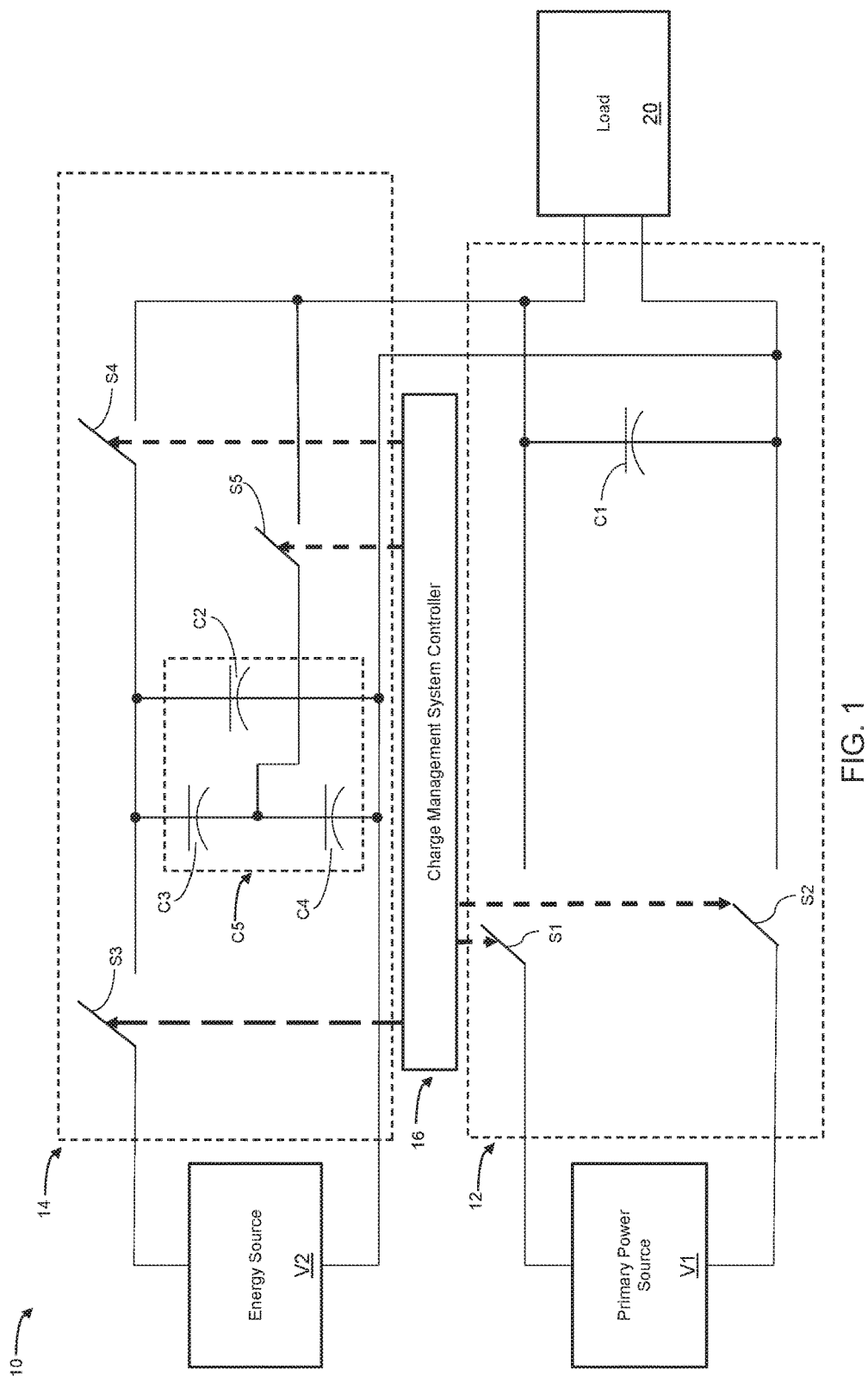
FIG. 1 is a schematic block diagram of an exemplary charge management system according to an embodiment of the invention.

Turning to FIG. 1, a schematic block diagram of an exemplary charge management system 10 is shown. The charge management system 10 includes a power distribution bus circuit 12, an intermediate energy storage circuit 14, and a charge management system controller 16 (also referred to as the system controller 16).

The power distribution bus circuit 12 may be operably connected to a primary power source V1 and a load 20. The load 20 may include one or more devices or equipment, such as electromechanical equipment, that demands power from the power source V1. Such electromechanical equipment may include alternating current (AC) or direct current (DC) electric motors, such as regenerative electric motor drives, that may be used for vehicles, such as a serial-hybrid or a parallel-hybrid vehicle; or the electromechanical equipment may include high-power electronic equipment, such as radars, Lidars, electronic warfare (EW) systems, pulsed radio frequency (RF) high-power directed energy weapons, or the like. The primary power source V1 (also referred to as the power source or power supply) may be an AC power source or a DC power source. For example, the AC power source may include an AC generator having a power factor correction (PFC) circuit, such as a three-phase rectifier assembly, for converting the AC power to DC. The DC power source may include, for example, battery packs, solar arrays, or a fuel cell, such as a hydrogen powered fuel cell. In exemplary non-limiting embodiments, the primary power source V1 may be a voltage source having 115 Vac, 270 Vdc, 400 Vdc, or 540 Vdc output voltage, or any other arbitrary voltage with an arbitrary frequency. It is understood that the foregoing examples of loads and/or power sources are for illustration and not limitation, and any suitable device operable by AC or DC power may be selected depending on the system requirements as understood by those having skill in the art.

The power distribution bus circuit 12 may include one or more primary power relay switches S1, S2 and at least one power bus capacitor C1. The primary power relay switches S1, S2 may be configured to operably connect the power source V1 to the load 20. The one or more primary power relay switches S1, S2 may include mechanical or solid state switches, or may include any other suitable device for interrupting the flow of electricity in the circuit. The at least one power bus capacitor C1 may be configured to store energy across the power distribution bus circuit 12. The power bus capacitor C1 may include an electrolytic capacitor, such as aluminum electrolytic capacitor; or a super capacitor, such as a high-capacity electrochemical capacitor; or may include any other capacitor having suitable capacitance for storing energy or charge in the circuit.

The intermediate energy storage circuit 14 may be operably connected to the power distribution bus circuit 12. The intermediate energy storage circuit 14 also may be operably connected to at least one energy source V2, which may include an AC power source or a DC power source. In some embodiments, the at least one energy source V2 may be substantially similar to or the same as the primary power source V1. For example, where the energy source V2 and the primary power source V1 are the same or similar, the at least one energy source V2 and the primary power source V1 may be operably coupled together to share the same power path, or may be integral with each other. In other embodiments, the at least one energy source V2 may be different from the primary power source V1. For example, where the at least one energy source V2 and the primary power source V1 are different, the at least one energy source V2 and the primary power source V1 may be operably coupled together to have different power paths, or may be integral with each other and have different power stages, or the at least one energy source V2 may be a separate standalone power source from the primary power source V1. In some embodiments, the at least one energy source V2 may be a plurality of energy sources operably coupled together in series or parallel. In exemplary embodiments the at least one energy source V2 may be AC, battery storage, or may be a fuel cell that generates DC, such as a hydrogen fuel cell, or, solar arrays, for example. In exemplary embodiments the energy source V2 may be a voltage source having a relatively low wattage. For example, in some embodiments, the energy source V2 may have a voltage of about 400 Vdc and a wattage of about 25 W. However, it is understood that the foregoing examples of the energy source are for illustration and not limitation, and any suitable energy source operable by AC or DC power may be selected depending on the system requirements as understood by those having skill in the art.

The intermediate energy storage circuit 14 may include at least one capacitor C5 for storing energy in the circuit 14. For example, as shown in the illustrated embodiment, the at least one capacitor C5 may include a first energy storage capacitor C2, a second energy storage capacitor C3, and a third energy storage capacitor C4. As shown, the second capacitor C3 and the third capacitor C4 may be operably connected in series with each other across the intermediate energy storage circuit 14, and the first energy storage capacitor C2 may be operably connected in parallel to the second capacitor C3 and the third capacitor C4. It is understood that the respective energy storage capacitors C2, C3, and/or C4 may be substantially similar to each other, or the respective capacitors C2, C3, and/or C4 may be different from each other. The energy storage capacitors C2, C3, and/or C4 may include an electrolytic capacitor, such as aluminum electrolytic capacitor; or a super capacitor, such as a high-capacity electrochemical capacitor; or may include any other capacitor having suitable capacitance for storing energy or charge in the circuit. In exemplary embodiments, the respective capacitors C2, C3, and/or C4 may have about the same capacitance or energy storage capacity as each other, which may be less than the capacitance or energy storage capacity of the power bus capacitor C1.

The intermediate energy storage circuit 14 may include at least one switch for operably connecting and/or disconnecting the intermediate energy storage circuit to or from the power distribution bus circuit 12 and/or the energy source V2. For example, as shown in the illustrated embodiment, the intermediate energy storage circuit 14 may include at least one energy storage capacitor charge switch S3 for operably connecting or disconnecting the at least one energy storage capacitor C5 to or from the energy source V2. In exemplary embodiments, the intermediate energy storage circuit 14 is configured such that, when the energy storage capacitor charge switch S3 is activated, the energy source V2 is able to charge the at least one energy storage capacitor C5, including one or more of the respective capacitors C2, C3, and/or C4.

The intermediate energy storage circuit 14 also may include at least one discharge switch S4 for operably connecting or disconnecting the at least one energy storage capacitor C5 to or from the power distribution bus circuit 12. As shown, the discharge switch S4 (also referred to as an energy storage capacitor discharge switch) may be configured such that, when activated, causes at least some energy from the at least one energy storage capacitor C5, including one or more of the energy storage capacitors C2, C3 and/or C4, to be discharged to the power bus capacitor C1 and/or to the load 20.

The intermediate energy storage circuit 14 may further include at least one energy capture charge switch S5 for operably connecting or disconnecting the power bus capacitor C1 to the at least one energy storage capacitor C5. More particularly, the capture charge switch S5 may be configured such that, when activated, causes at least some energy in the power bus capacitor C1 to be discharged to the at least one energy storage capacitor C5, including one or more of the first energy storage capacitor C5, and the energy storage capacitors C3 and C4 (also referred to as energy capture capacitors). It is understood that the respective switches S3, S4 and/or S5 may include mechanical or solid state switches, including field effect transistors (FETs), or the like; or may include any other suitable device for interrupting the flow of current in the circuit.

The system controller 16 may be operably connected to the one or more switches in the power distribution bus circuit 12, including the power relay switches S1 and S2, and also may be operably connected to the one or more switches in the intermediate energy storage circuit 14, including the energy storage capacitor charge switch S3, the discharge switch S4, and the capture charge switch S5. As will be described in further detail below, the system controller 16 may be configured to operate the exemplary charge management system 10 by activating or deactivating the respective switches based upon a determination of one or more conditions associated with the respective circuits 12 and 14, the energy source V2, the primary power source V1, and/or the load 20, among other considerations. It is understood that the system controller 16 may encompass all apparatus, devices, and/or machines for processing data. For example, the system controller 16 may include a digital signal processor (DSP), an application specific integrated circuit (ASIC), a field-programmable gate array (FPGA) integrated circuit, an analog controller, discrete control circuitry, or any other suitable device for controlling operation of the charge management system 10.

Figure 2:
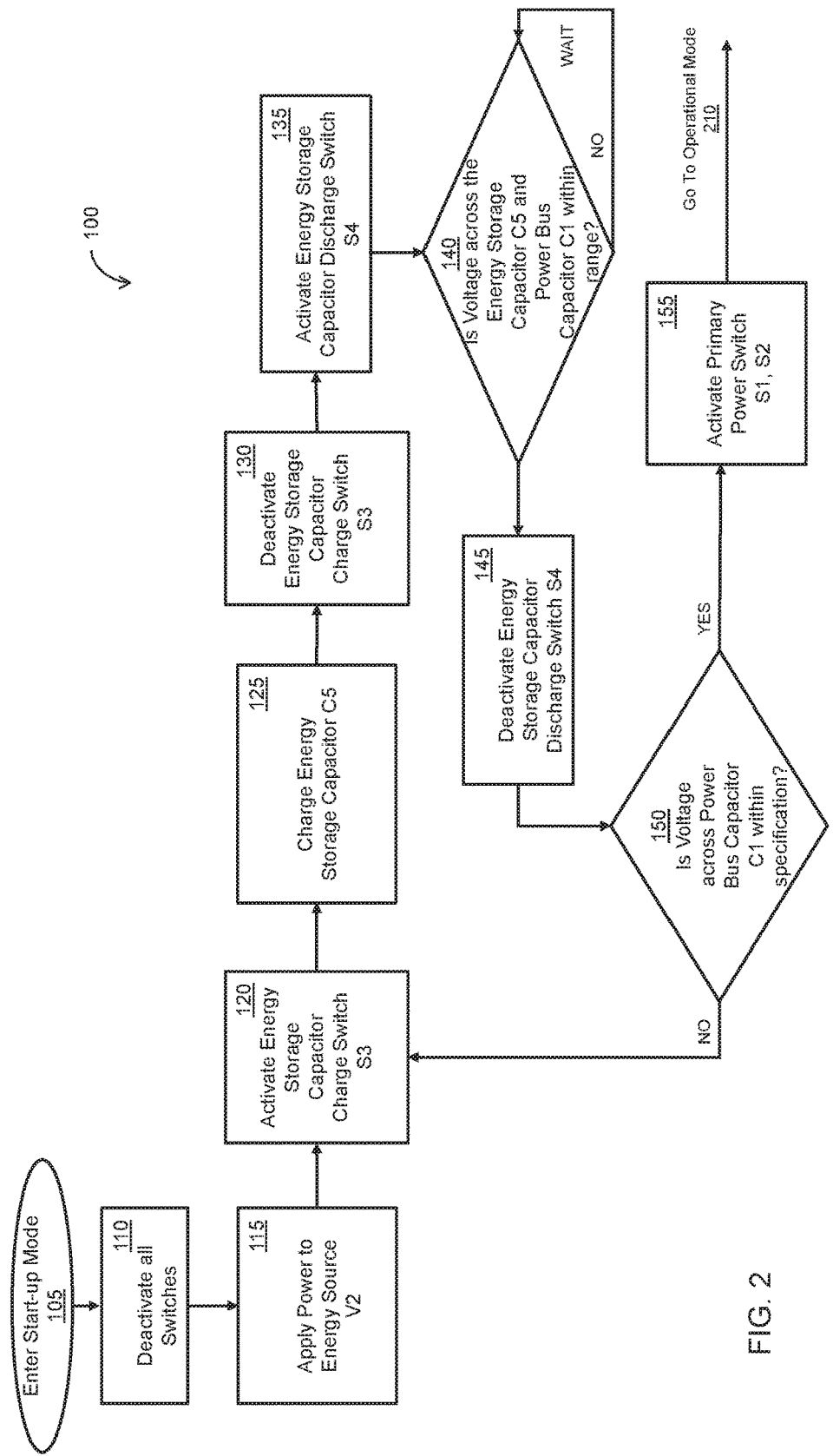
FIG. 2 is a flow chart illustrating an exemplary start-up mode using the charge management system in FIG. 1.

Turning to FIG. 2, a flow chart illustrating an exemplary method 100 of operating the charge management system 10 during a start-up mode is shown. The exemplary process may begin at step 105 where the charge management system is activated and enters the start-up mode. At step 110, the system controller 16 may deactivate or open all switches in the respective circuits 12 and 14, including switches S1, S2, S3, S4 and S5. Once it is determined that all of the switches have been deactivated, the process may proceed to step 115 where power may be applied to the energy source V2. At step 120, the energy storage capacitor charge switch S3 may be activated or turned-on to operably connect the energy source V2 to the at least one energy storage capacitor C5. Thereafter, at step 125, the at least one energy storage capacitor C5, including one or more of the energy storage capacitors C2, C3 and/or C4, may be charged by the energy source V2 to a predetermined energy level or predetermined energy range. In exemplary embodiments, the typical step voltage defining the predetermined range will be approximately 1-2% of the voltage across the power bus capacitor C1. By way of a non-limiting example, if the power bus capacitor C1 is to be charged to 270 Vdc, the typical step voltage defining the predetermined range will be approximately 1-2% of 270 Vdc, or 5-10 Vdc±2 Vdc. In exemplary embodiments, the energy source V2 is a voltage source that charges the at least one energy storage capacitor C5 to a voltage determined by the voltage source, where the rate of such charge may be arbitrary. This may allow for the voltage source to be a small wattage power supply, such as about 10 W, for example. It is noted at this point during the operation, when the energy storage capacitor charge switch S3 is activated and the energy capture charge switch S5 is deactivated, the second capacitor C3 and the third capacitor C4 may be operably connected in series with each other across the intermediate energy storage circuit 14, and the first energy storage capacitor C2 may be operably connected in parallel to the second capacitor C3 and the third capacitor C4. It is also noted that at this point during the operation, the discharge switch S4 is deactivated to operably disconnect the at least one energy storage capacitor C5 from the power bus circuit 12. In this manner, as the load 20 is usually isolated from the power source V1, such as via a transformer, the load 20 is also disconnected from the at least energy storage capacitor C5.

After it has been determined that the at least one energy storage capacitor C5 has been charged to the predetermined level, the start-up operation may proceed to step 130 where the energy storage capacitor charge switch S3 may be deactivated or turned-off to operably disconnect the at least one energy storage capacitor C5 from the energy source V2. At step 135, the discharge switch S4 is activated to operably connect the at least one energy storage capacitor C5 to the at least one power bus capacitor C1 in the power distribution bus circuit 12. Once the discharge switch S4 has been activated in this manner, at least some of the energy stored in the at least one energy storage capacitor C5 may be instantaneously discharged to the power bus capacitor C1 and stored. In exemplary embodiments, the discharge of energy from the at least one energy storage capacitor C5 includes discharge of the energy stored in the energy storage capacitor C2 that is in parallel with the combination of the energy storage capacitors C3 and C4, which are connected in series with each other.

At step 140, the system controller 16 may determine whether the discharging of the at least one energy storage capacitor C5 to the at least one power bus capacitor C1 is complete (e.g., whether voltage across the at least one energy storage capacitor C5 and the voltage across the power bus capacitor C1 are within a predetermined range. In exemplary embodiments, the typical charge termination voltage defining the predetermined range will be approximately 90% of the voltage across the power bus capacitor C1. By way of a non-limiting example, if the power bus capacitor C1 is to be charged to 270 Vdc, the typical charge termination voltage defining the predetermined range will be approximately 90% of 270 Vdc, or 250 Vdc. If it is determined that the discharging is not complete, then the operation may wait and continue discharging C5 and charging C1. Once the discharging is complete (e.g., voltage across the respective capacitors C5, C1 is within the predetermined range), then the start-up operation may proceed to step 145 whereby the discharge switch S4 is deactivated to operably disconnect the at least one energy storage capacitor C5 from the at least one power bus capacitor C1. Thereafter, at step 150, the system controller 16 determines whether the voltage across the at least one power bus capacitor C1 is within a specified range, such as at the charge termination voltage defined above. If it is determined that the power bus capacitor C1 has not been charged to within the specified range, then the process repeats by proceeding to step 120. When it is determined that the power bus capacitor C1 has been charged to within the specified range, then the process may proceed to step 155 where the primary power relay switches S1, S2 are activated to operably connect the power source V1 to the load 20.

Figure 3A:
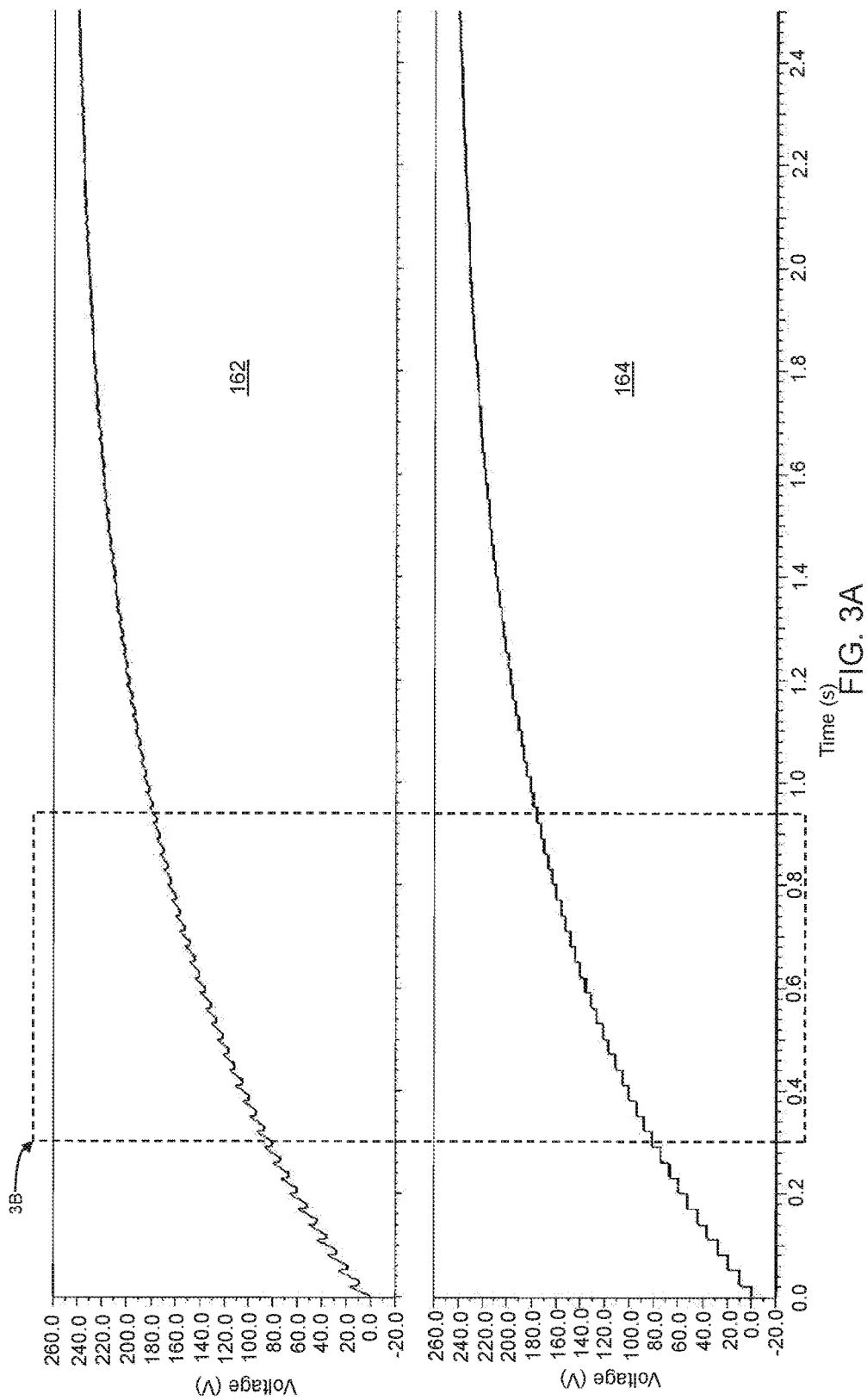
FIG. 3A is an x-y plot diagram illustrating an exemplary simulation according to a portion of the start-up mode in FIG. 2.

Referring to FIG. 3A, an x-y plot diagram illustrating a portion of the start-up operation 100 is shown. In the illustrated diagram, the voltage across the at least one energy storage capacitor C5 (in volts) is plotted on the y-axis in the top portion 162 of the graph, and the voltage across the at least one power bus capacitor C1 (in volts) is plotted on the y-axis in the bottom portion 164 of the graph. The voltage of C5 (162) and the voltage of C1 (164) are plotted over the same time scale (x-axis, in seconds) during the sequence of charging the at least one energy storage capacitor C5 (e.g., via steps 120 through 130 discussed above with reference to FIG. 2), and then discharging that energy to the power bus capacitor C1 (e.g., via steps 135 through 145 discussed above), and then repeating this sequence (e.g., via step 150 and back to step 120, as discussed above).

Figure 3B:
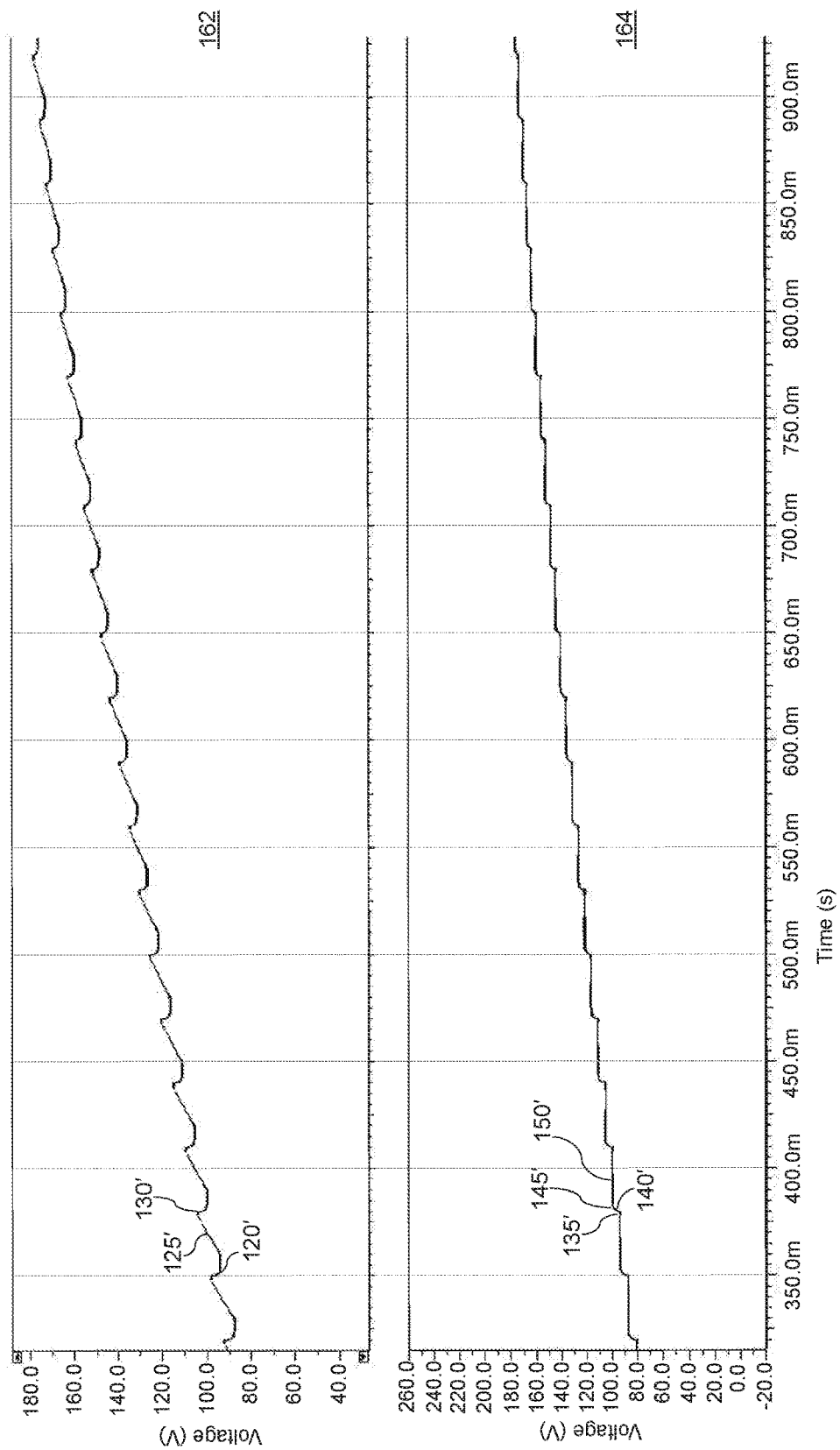
FIG. 3B is a close-up view of FIG. 3A.

Referring to FIG. 3B, a close-up view of a portion of FIG. 3A is shown between the times of about 325 milliseconds to about 950 milliseconds. The reference numerals used in FIG. 3B correspond to the respective steps in the flow chart of FIG. 2 to illustrate the exemplary start-up mode of operation 100 for the charge management system 10. For example, as shown in FIG. 3B, when the energy storage capacitor charge switch is activated (step 120'), the at least one energy storage capacitor is charged by the energy source (step 125'), which is shown as the energy storage capacitor voltage ramps up over the next 50 milliseconds, or so. The energy storage capacitor is charged to a predetermined level or range, which in the exemplary embodiment is about a 20V increase from about 95V to about 105V at this point during the operation. The 20V increase is an arbitrary value that was selected in this non-limiting example so as to demonstrate the operation of the circuitry. The energy capacitor charge switch is then deactivated (step 130') and soon after the energy storage capacitor discharge switch is activated (step 135'), thereby discharging the energy stored in the energy storage capacitor to the power bus capacitor, which is shown as the instantaneous increase of the power bus capacitor voltage to within a predetermined range. In this non-limiting example, the predetermined range is defined by the voltage across the power bus capacitor being about equal with the energy storage capacitor voltage, or about 20 Vdc±2 Vdc in the exemplary embodiment. During this time, the system controller may determine whether the voltage across the power bus capacitor is within the predetermined range (step 140'), and once the voltage across the power bus capacitor reaches this range, then the discharge switch is deactivated (step 145'). The system controller may then determine whether the voltage across the power bus capacitor is within a specified range to activate the primary power switch (step 150'). If the voltage across the power bus capacitor should still be increased, then the process repeats, which is shown in the exemplary embodiment as repeating about every 55 milliseconds until the power bus capacitor voltage reaches 240V in this example (shown in FIG. 3A). When it is determined that the power bus capacitor voltage is within the specified range, such as 240V in this example, the primary power switch is activated (step 155').

Referring to FIGS. 4A and 4B, an exemplary simulation of the start-up mode of operation is shown using the exemplary charge management system 10 (shown in FIG. 4B) compared with a start-up mode of operation that does not use the charge management system (shown in FIG. 4A). As shown in FIG. 4A, during the start-up of the system that does not use the exemplary charge management system, the peak inrush current when the power source is operably connected to the load is 450 amperes (shown at reference numeral 165'). In comparison, referring to the top graph 170 in FIG. 4B, the repeated step function is shown, which corresponds to the increase in voltage of the power bus capacitor over time (similarly to that which is shown in FIG. 3). As shown in the bottom graph 175 of FIG. 4B, when the power source is connected to the load, the peak inrush current is only 42 amperes (as shown at reference numeral 165"), which is about a 90% reduction over the system that does not use the charge management system. In the illustrated example, the 42 amperes of inrush current using the exemplary charge management system is only marginally higher than the 39 amperes of current drawn from a 10 W power supply during full load operation. In addition, the illustrated example shows that such a charge management system may allow the at least one power bus capacitor for a 10 W power supply to be charged up by a 25 W energy source to attain normal operating voltage in 5 seconds without the use of dissipative resistors.

Figure 5:
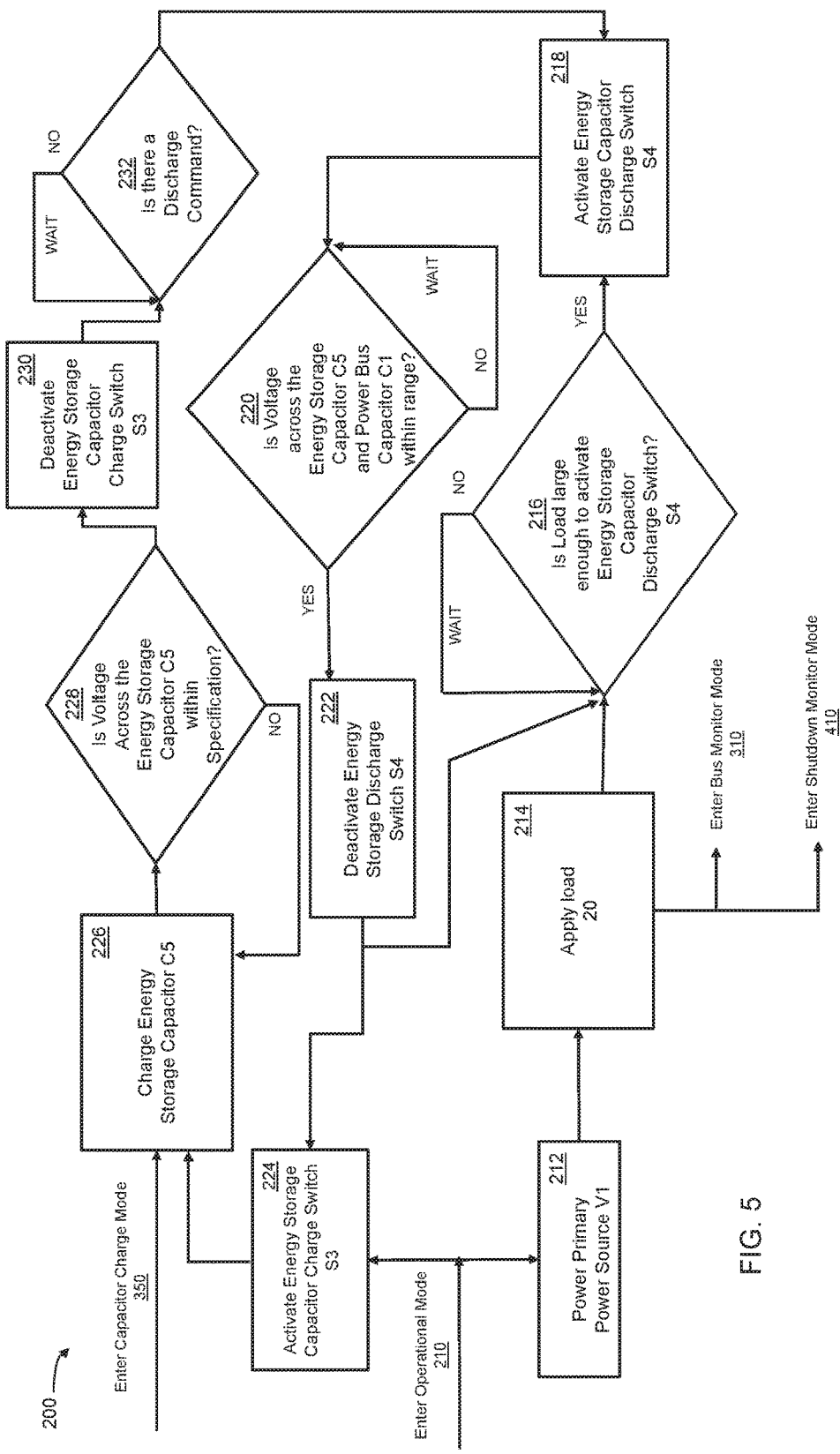
FIG. 5 is a flow chart illustrating an exemplary operational mode using the charge management system in FIG. 1.

Turning to FIG. 5, a flow chart illustrating an exemplary method 200 of operating the charge management system 10 during a normal operational mode is shown. The operation may begin at step 210, where the system controller 16 may enter the operational mode following the start-up mode illustrated in FIG. 2. During the operational mode 200, the primary power source V1 is activated and is operably connected to the load 20, as shown in steps 212 and 214. It is also noted that when entering the operational mode at step 210, based upon a determination that the at least one energy storage capacitor C5 is below a threshold level and needs charged, the process may optionally also proceed to step 224 where the energy storage capacitor charge switch S3 is activated to charge the at least one energy storage capacitor C5, as discussed in further detail below.

After the load is applied in step 214, the process may then proceed to step 216 where the system controller 16 may determine load current demand. The operation may then wait until the system controller 16 determines that the load 20 demands current that meets or exceeds a predetermined level, whereupon the process may then proceed to step 218. The predetermined level may be selected according to design requirements, as understood by those having skill in the art. For example, in exemplary embodiments, the predetermined level may be about 25±2% of maximum pulsed load. At step 218, the energy storage discharge switch S4 is activated to operably connect the at least one energy storage capacitor C5 to the at least one power bus capacitor C1, thereby discharging at least some energy stored in the energy storage capacitor C5 and at least some energy stored in the power bus capacitor C1 to the load 20. The charge transfer to the load is given by the equation:

$$V\text{bus}=[V(\text{initial of storage cap})*\text{Capacitance}(\text{storage cap }C5)+V(\text{initial of bus cap})*\text{Capacitance}(\text{bus cap }C1)]/[\text{Capacitance}(\text{storage cap }C5)+\text{Capacitance}(\text{bus cap})C1]$$

where:

Vbus is the voltage across the power bus circuit 12,

V(initial of storage cap) is the initial voltage across the at least one storage capacitor C5, Capacitance(storage cap) is the capacitance of the at least one storage capacitor C5 (in combination), V(initial of bus cap) is the voltage across the at least one power bus capacitor C1, and Capacitance(bus cap) is the capacitance of the at least one power bus capacitor C1.

In exemplary embodiments, when the discharge switch S4 is activated, the energy is instantaneously transferred to the load 20 from the power bus capacitor C1 in parallel combination with the at least one energy storage capacitor C5 (including the energy storage capacitor C2 that is in parallel with the combination of the energy storage capacitors C3 and C4, which are connected in series with each other). Advantageously, such an instantaneous charge transfer of energy to the load 20 increases the output voltage of the power distribution bus circuit 12, which may reduce undershoot associated with right-hand plane zeroes in boost topology power sources. In other words, right-hand plane zeroes are often caused by the transfer function:

$$V\text{out}=V\text{in}*(1/1-DC)$$

where:

Vout is the voltage out of the power bus circuit 12 to the load 20,

Vin is the voltage into the power bus circuit 12 from the power source V1, and

DC is the current, such as direct current, demanded by the load.

Accordingly, increased current demanded by the load may cause the current, or DC, to increase because Vout decreases. However, by using the exemplary charge management system and instantaneously transferring charge in the manner described above, instead of DC decreasing, the DC increases thereby forcing the voltage going to an error amplifier to also increase. The result is that Vout increases and the undershoot associated with the right-hand plane zeroes is reduced.

After the discharge switch S4 has been activated at step 218 and during the discharge of the respective capacitors C1 and C5 (including one or more of C2, C3 and C4), the system controller 16 may determine at step 220 whether the discharging is complete (e.g., whether voltage across the at least one energy storage capacitor C5 and the voltage across the power bus capacitor C1 are within a predetermined range, such as about ±10% of each other. If it is determined that the discharging is not complete, then the operation may wait and continue the discharging. Once the discharging is complete (e.g., voltage across the respective capacitors C5, C1 is within ±10% of each other), then the operation may proceed to step 222 where the discharge switch S4 is deactivated to operably disconnect the at least one energy storage capacitor C5 from the at least one power bus capacitor C1.

After the discharge switch S4 has been deactivated at step 222, the operation may then proceed to repeat steps 216 through 222. The process may proceed in this manner based on a determination that the at least energy storage capacitor C5 has sufficient charge to accommodate increased load current demand, as discussed above. On the other hand, when it is determined that the at least one energy storage capacitor C5 is below a threshold energy level and may require additional charge, then the process may proceed from step 222 to step 224. At step 224, the energy storage capacitor charge switch S3 may be activated to operably connect the energy source V2 to the at least one energy storage capacitor C5. Thereafter, at step 226, the at least one energy storage capacitor C5 may be charged by the energy source V2 to a predetermined energy level or predetermined energy range, which may be determined by the system controller 16 at step 228. By way of a non-limiting example, for a 270 Vdc power bus voltage C1, the voltage across the at least one energy storage capacitor C5 may be about 400 Vdc±10 Vdc. After it has been determined that the at least one energy storage capacitor C5 has been charged to the predetermined level, the operation may proceed to step 230 where the energy storage capacitor charge switch S3 is deactivated to operably disconnect the at least one energy storage capacitor C5 from the energy source V2. The process then waits at step 232 until there is a discharge command from the system controller 16. As shown, the discharge command may be based upon a determination to activate the discharge switch S3 at step 216, whereupon the process proceeds to enter the loop at step 218.

Referring to FIGS. 6A and 6B, an exemplary simulation of the operational mode 200 is shown using the exemplary charge management system 10 (shown in FIG. 6B) compared to an operational mode that does not use the charge management system (shown in FIG. 6A). As shown in FIG. 6A, during operation of the system that does not use the exemplary charge management system, the baseline current demanded by the load is less than 5 amperes (shown at reference numeral 265'), and when the load demands increased current, the peak inrush current to the load increases to about 95 amperes (shown at reference numeral

270'). In comparison, referring to FIG. 6B, during operation of the exemplary charge management system 10, the baseline current demanded by the load is also less than 5 amperes (shown at reference numeral 265"), however when the load demands increased current and it is determined to activate the discharge switch S4 to discharge the energy from the at least one energy storage capacitor C5, the peak inrush current to the load only increases to about 42 amperes (shown at reference numeral 270"). As discussed above with respect to the start-up mode of operation, the 42 amperes of inrush current using the exemplary charge management system during the operational mode is only marginally higher than the 39 amperes of current drawn from a 10 W power supply during full-load operation. In this manner, the charge management system may reduce the load applied inrush by about 50%, and using a 25-watt energy source, this 50% reduction can be realized every 5 seconds, for example.

Figure 7:
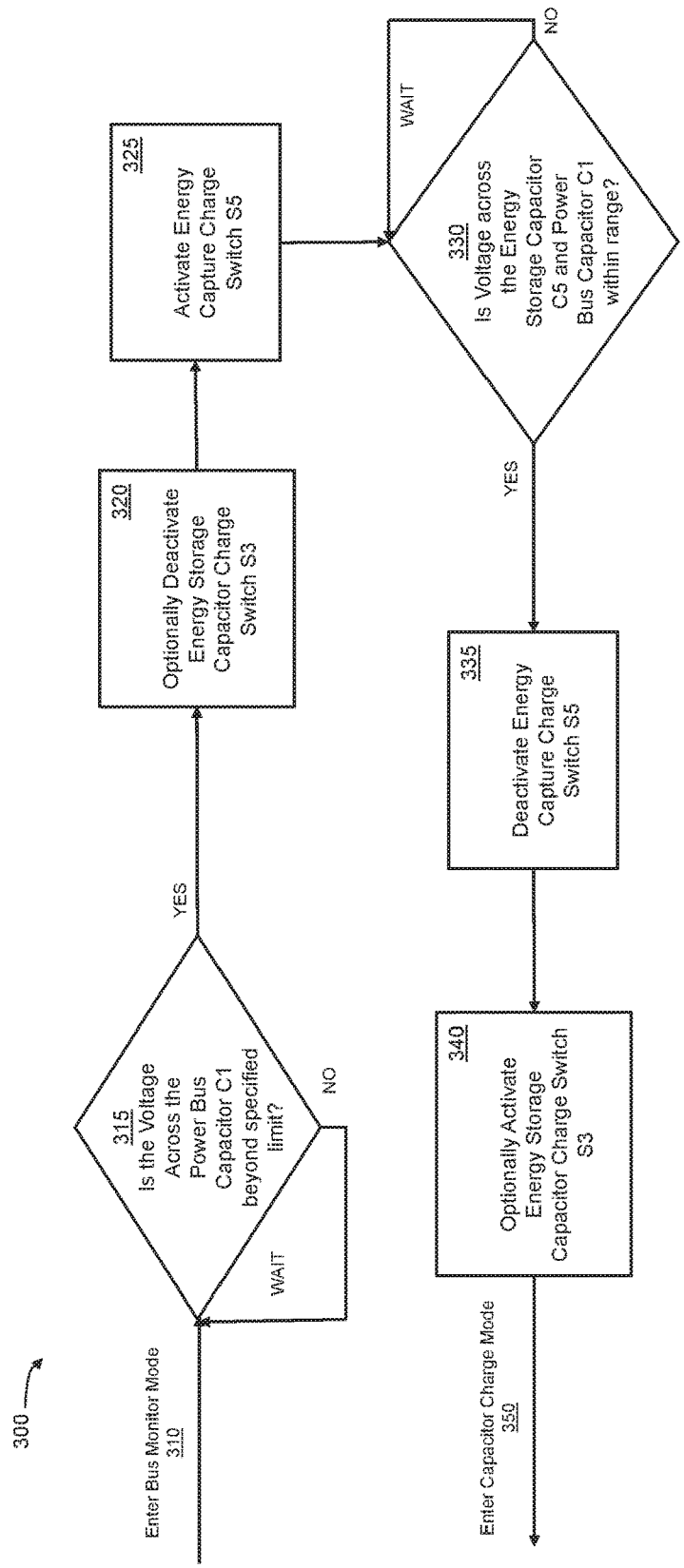
FIG. 7 is a flow chart illustrating an exemplary regenerative mode using the charge management system in FIG. 1.

Turning to FIG. 7, a flow chart illustrating an exemplary method 300 of operating the charge management system 10 during a regenerative mode is shown. The operation may begin at step 310 where the system controller 16 may enter into a power bus monitor mode during the normal operational mode shown in FIG. 5. As shown at step 310 in FIG. 5, the power bus monitor mode may be constantly operating while the load 20 is applied. As shown in FIG. 7, after entering the power bus monitor mode at step 310, the process may proceed to step 315 where the system controller 16 may determine voltage across the at least one power bus capacitor C1 in the power distribution bus circuit 12. If the system controller 16 determines that the power bus capacitor C1 has an energy level that is below a threshold energy level or range, the controller may continue to monitor the power bus capacitor C1 and wait. When the system controller 16 determines that the voltage across the at least one power bus capacitor C1 is greater than a predetermined level or range, then the process may proceed to step 320 and/or step 325.

At step 320, the system controller 16 may optionally deactivate the energy storage charge switch S3 and also may deactivate the discharge switch S4. At step 325, the energy capture switch S5 may be activated to operably connect the at least one power bus capacitor C1 to the at least one energy storage capacitor C5, thereby discharging at least some energy stored in the at least one power bus capacitor C1 to the at least one energy storage capacitor C5 (including one or more of the capacitors C2, C3, and/or C4). In exemplary embodiments, when the energy storage capacitor charge switch S3 is deactivated and the energy capture charge switch S5 is activated, the second energy storage capacitor C3 and the first energy storage capacitor C2 may be operably connected in series with each other, and the third energy storage capacitor C4 may be operably connected in parallel to both the second capacitor C3 and the first capacitor C2. In this manner, when the capture charge switch S5 is activated, the energy from the power bus capacitor C1 may be transferred to the third capacitor C4, which is in parallel with C1 and C2, which are in series with each other.

After the capture charge switch S5 has been activated at step 325 and during the discharge of energy from the power bus capacitor C1 to the at least one energy storage capacitor C5, the system controller 16 may determine at step 330 whether the discharging is complete (e.g., voltage across the at least one energy storage capacitor C5 and the voltage across the power bus capacitor C1 are within a predetermined range, such as about ±5% of the maximum allowable voltage of the power bus circuit 12. For example, in exemplary embodiments, a 270 Vdc may be allowed to go to 320 Vdc, which would allow for a voltage spike of 270 Vdc±13 Vdc. This would be well within the allowable voltage of a 400V-rated capacitor. If it is determined that the discharging is not complete, then the operation may wait and continue discharging. Once the discharging is complete (e.g., when voltage across C5 and C1 is within the predetermined range), then the operation may proceed to step 335 where the capture charge switch S5 is deactivated to operably disconnect the at least one power bus capacitor C1 from the at least one energy storage capacitor C5.

After the capture charge switch S5 has been deactivated at step 335, the operation may optionally proceed to step 340 and then to step 350 to enter a capacitor charge mode as shown in FIG. 5. The process may proceed in this manner based on a determination that the at least one energy storage capacitor C5 is below a threshold energy level and may require additional charge. If it is determined that the at least one energy storage capacitor C5 should be charged, the energy storage capacitor charge switch S3 may be activated at step 340 to operably connect the energy source V2 to the at least one energy storage capacitor C5, thereby charging the at least one energy storage capacitor C5 as shown at step 226 of FIG. 5. Energy stored in the energy storage capacitor C5 may later be used in the start-up or operational modes described above. This way energy is conserved instead of being wasted as in prior art circuit designs, thus improving efficiency.

Figure 8:
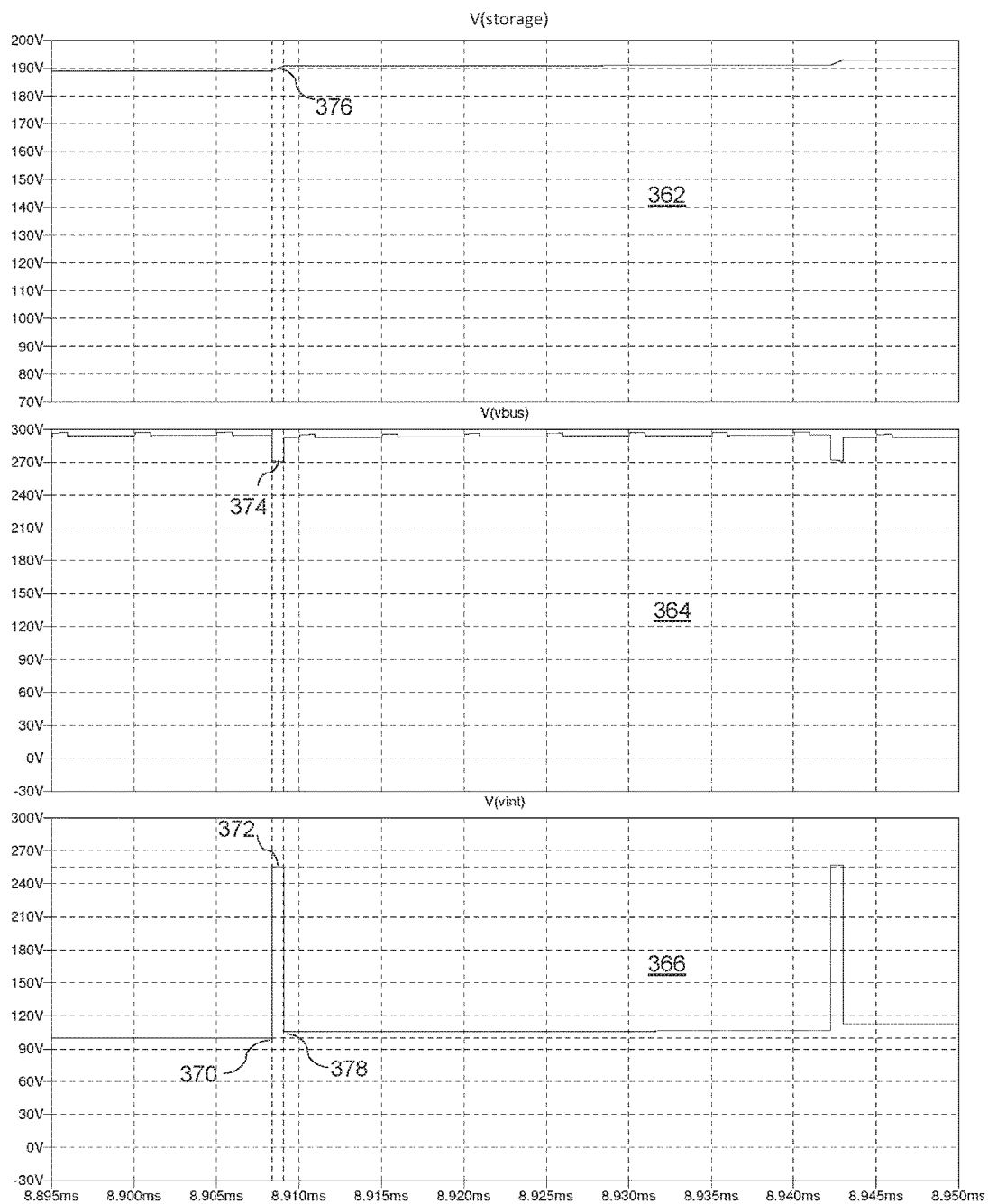
FIG. 8 is an x-y plot diagram illustrating an exemplary simulation of a regenerative over-volt protection mode during a start-up period using the charge management system in FIG. 1.

Turning to FIG. 8, an exemplary simulation of a regenerative over-volt protection mode during a portion of an exemplary start-up period using the charge management system 10 is shown. In the illustrated example, a close-up view of a time period (x-axis) between about 8.89 milliseconds and about 8.95 milliseconds during the start-up mode is shown. A top portion 362 of the x-y plot in FIG. 8 depicts voltage of the first energy storage capacitor C2 (y-axis, in volts), a middle portion 364 of the x-y plot depicts voltage across the power bus capacitor C1 (y-axis, in volts), and a bottom portion 366 of the x-y plot depicts voltage across the third energy storage capacitor C4 (y-axis, in volts). The voltage of C2 (362), the voltage of C1 (364), and the voltage of C4 (366) are plotted over the same time scale (x-axis, in milliseconds) during the illustrated sequence.

As shown in FIG. 8, during an initial period between about 8.895 milliseconds and about 8.908 milliseconds, the voltage of the third energy storage capacitor C4 is constant at about 106 Vdc. During this initial period, the energy capture charge switch S5 is deactivated and the energy discharge switch S4 is also deactivated. At about 8.908 milliseconds, the energy capture charge switch S5 is activated (shown at reference numeral 370), whereupon the energy storage capacitor C4 charges from about 106 Vdc to about 256 Vdc almost instantaneously (shown at reference numeral 372). During this time when the capture charge switch S5 is initially activated, the voltage of the power bus capacitor C1 decreases almost instantaneously from about 295 Vdc to about 271 Vdc (shown at reference numeral 374). The approximately 15 volts of difference between the power bus capacitor C1 (at about 271 Vdc) and the energy storage capacitor C4 (at about 256 Vdc) is due to the resistance in the capture charge switch S5.

In the illustrated example, the energy storage capacitor charge switch S3 is also activated during the time period when the energy capture charge switch S5 is activated, and the discharge switch S4 remains deactivated. In this configuration, the second energy storage capacitor C3 and the first energy storage capacitor C2 may be operably connected in series with each other across the intermediate energy storage circuit 14, and the third energy storage capacitor C4 may be operably connected in parallel to the series combination of the second capacitor C3 and the first capacitor C2. In this manner, over the time period when S5 is activated and S3 is activated, the voltage of the energy storage capacitor C2 increases at a linear rate by the parallel coupling between C4 and C2. For example, as shown at reference numeral 376, the voltage of C2 increases by about 1.5 Vdc over the time period of about 624 nanoseconds when S5 and S3 are activated. It is noted, however, that in exemplary embodiments the energy charge switch S3 may be deactivated during the time period when the capture charge switch S5 is activated. In comparison to the illustrated example, this would have resulted in the voltage of the first energy storage capacitor C2 increasing by about 0.3 Vdc over the 624 nanosecond time period when S5 were activated.

As shown, after the timed pulse period of about 624 nanoseconds, the capture charge switch S5 is deactivated (shown at reference numeral 378). In the illustrated example, when the capture charge switch S5 is deactivated, the voltage across the energy storage capacitor C4 is about 7 Vdc higher than it was before the pulsed charge event due to the transfer of at least some energy from the power bus capacitor C1. In addition, the voltage across the energy storage capacitor C1 is about 1.5 Vdc higher than it was before the pulsed charge event. In this manner, at least some charge has been transferred from the power bus capacitor C1 to the at least one energy storage capacitor C5 during the exemplary start-up period. As shown, the process may repeat after a predetermined period of time, for example at about 8.942 milliseconds in the illustrated example. It is understood that the foregoing example is for illustration, and not limitation, and various other voltage values and time values could be used, as understood by those having skill in the art. It is also understood that such an exemplary regenerative over-volt protection mode may be used during the operational mode described above.

Figure 9:
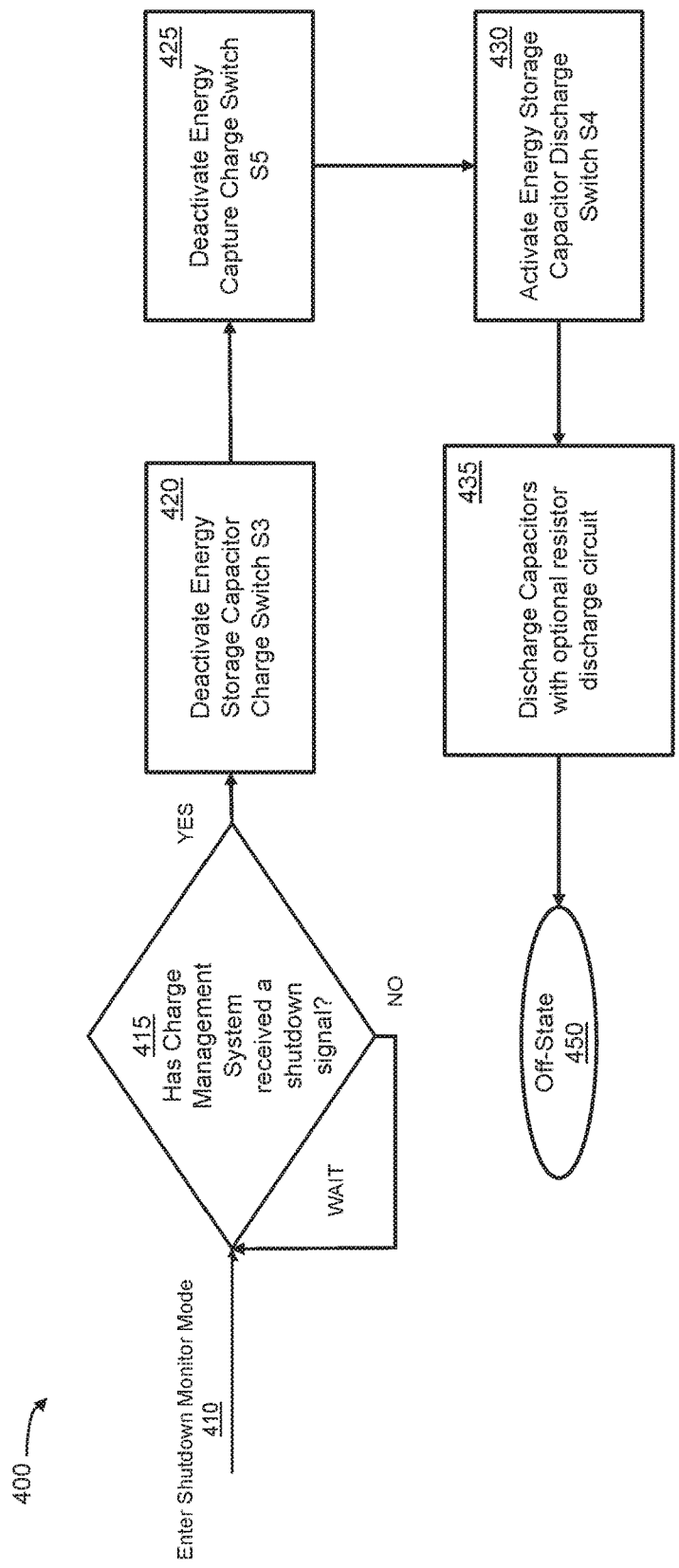
FIG. 9 is a flow chart illustrating an exemplary shut-down mode using the charge management system in FIG. 1.

Turning to FIG. 9, a flow chart illustrating an exemplary method 400 of operating the charge management system 10 during a shutdown mode is shown. The operation may begin at step 410 where the system controller 16 enters a shutdown monitor mode during the normal operational mode shown in FIG. 5. As shown at step 410 in FIG. 5, the shutdown monitor mode may be constantly operating while the load 20 is applied. As shown in FIG. 9, after entering the shutdown monitor mode at step 410, the process may proceed to step 415 where the system controller 16 may determine whether a shutdown command signal has been received. If the system controller 16 determines that such a shutdown command signal has not been received, the controller may continue to monitor the system and wait. When the system controller 16 determines a shutdown command signal has been received, then the load 20 may be deactivated and may be operably disconnected from the power source V1 by deactivating the primary power relay switches S1, S2. The process may then proceed to step 420, step 425 and/or step 430. As shown, at step 420, the energy storage capacitor charge switch S3 is deactivated to operably disconnect the at least one energy storage capacitor C5 from the energy source V2. At step 425, the capture charge switch S5 is deactivated to operably disconnect the power bus capacitor C1 from the at least one energy storage capacitor C5, so as to impede charging in the intermediate energy storage circuit 12. At step 430, the energy storage capacitor discharge switch S4 is activated to operably connect the at least one energy storage capacitor C5 to the power bus capacitor C1, thereby discharging the energy stored in the respective capacitors C2, C3, C4. As shown at step 435, the energy stored in the at least one energy storage capacitor C5 and the energy stored in the power bus capacitor C1 may be discharged to an optional resistor discharge circuit (not shown). The process may then end at the off-state shown at step 450.

In exemplary embodiments, the shut-down mode may also include a regenerative over-volt protection mode to discharge and store the excess energy in the power bus circuit 12 caused by deactivation of the load 20. For example, when the system controller 16 determines that the load 20 has been deactivated and/or that the voltage across the power bus capacitor C1 is over a predetermined level, the energy storage discharge switch S3 may be deactivated and the capture charge switch S5 may be activated. The excess energy from the power bus capacitor C1 may then be discharged to the at least one energy storage capacitor C5, and more particularly the energy capture capacitors C3 and C4, for storage of such energy.

Figure 10A:
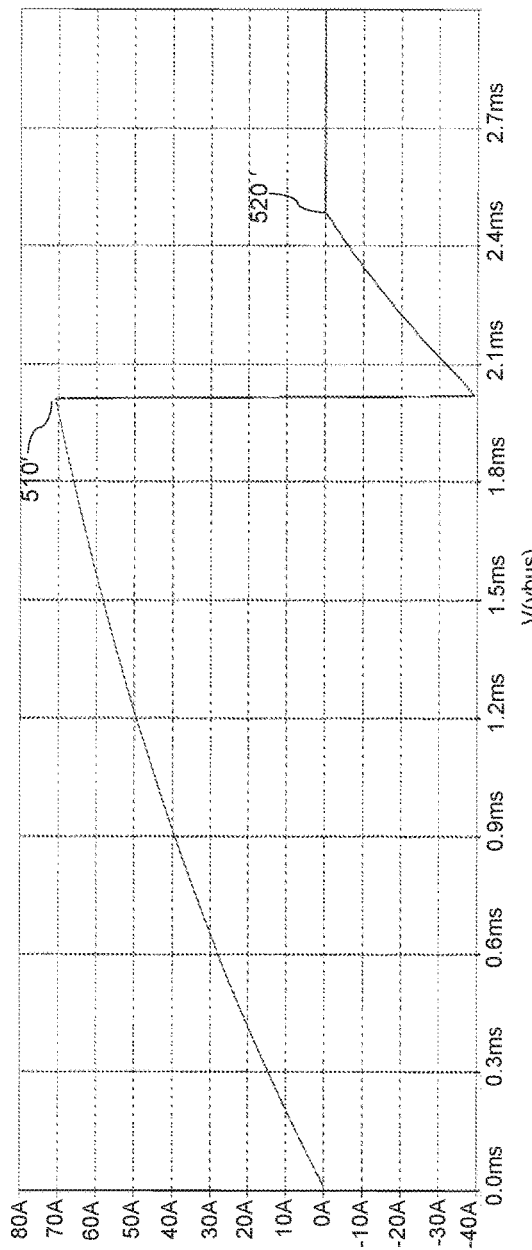
FIGS. 10A and 10B are x-y plot diagrams illustrating a simulation of a shut-down mode according to a system that does not use the charge management system in FIG. 1.
Figure 10B:
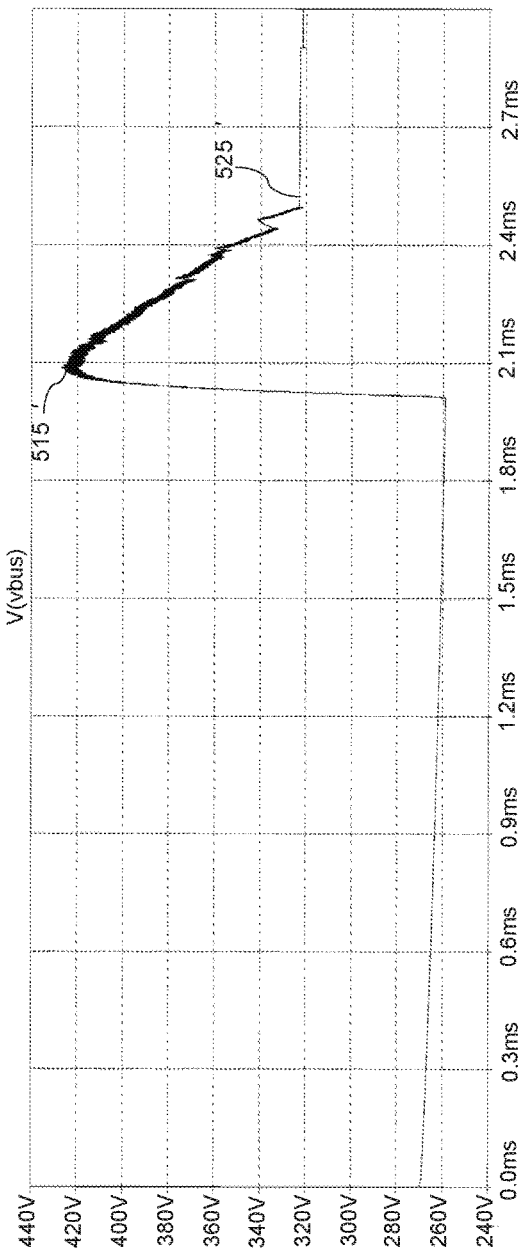

Referring to FIGS. 10A, 10B, 11A, and 11B, an exemplary simulation of such regenerative over-volt protection during a shut-down mode is shown using the exemplary charge management system 10 (shown in FIGS. 11A and 11B) compared to such a mode that does not use the charge management system (shown in FIGS. 10A and 10B). In the illustrated examples of FIGS. 10A, 10B, 11A, and 11B, the primary power source (e.g., V1) is 270 Vdc, and the energy source (e.g., V2) is a voltage source having 400 Vdc. The load (e.g., 20) may be operably disconnected from the power distribution bus circuit (e.g., 12) via field effect transistors (FETs) or the like.

In the illustrated example, FIG. 10A depicts current (in amperes) through the load (c.f., 20) over time (in milliseconds), and FIG. 10B depicts the voltage (in volts) across the power bus capacitor (c.f., C1) over time (in milliseconds). As shown in FIGS. 10A and 10B with the system that does not use the exemplary charge management system, at 2 milliseconds the FETs are deactivated to operably disconnect the load (shown at 510'), and at 2.09 milliseconds the voltage across the power bus capacitor increases to 426 Vdc (shown at 515'). In addition, the current through the load goes to zero at approximately 2.6 milliseconds (shown at 520'), and the voltage across the power bus capacitor remains at about 320 Vdc (shown at 525') as there is nowhere for the energy to be distributed.

In comparison, FIGS. 11A and 11B illustrate a simulation using the exemplary charge management system 10, where FIG. 11A depicts current (in amperes) through the load 20 over time (in milliseconds), and FIG. 11B depicts the voltage (in volts) across the power bus capacitor C1 over time (in milliseconds). As shown in FIGS. 11A and 11B, at 2 milliseconds the FETs are deactivated to operably disconnect the load (shown at 510"). The system controller 16 then determines that the load has been deactivated, and the energy storage charge switch S3 is deactivated and the energy capture switch S5 is activated, thereby enabling energy in the power bus capacitor C1 to be discharged to the to the energy capture capacitors C3 and C4, as discussed above. At about 2.02 milliseconds, the voltage across the power bus capacitor C1 is 312 Vdc (shown at 515"), which is 114 Vdc less than that shown in FIGS. 9A and 9B. In addition, the current through the load 20 goes to zero at approximately 2.6 milliseconds (shown at 520"), and the voltage across the power bus capacitor C1 remains at about 280 Vdc (shown at 525").

Figure 12:
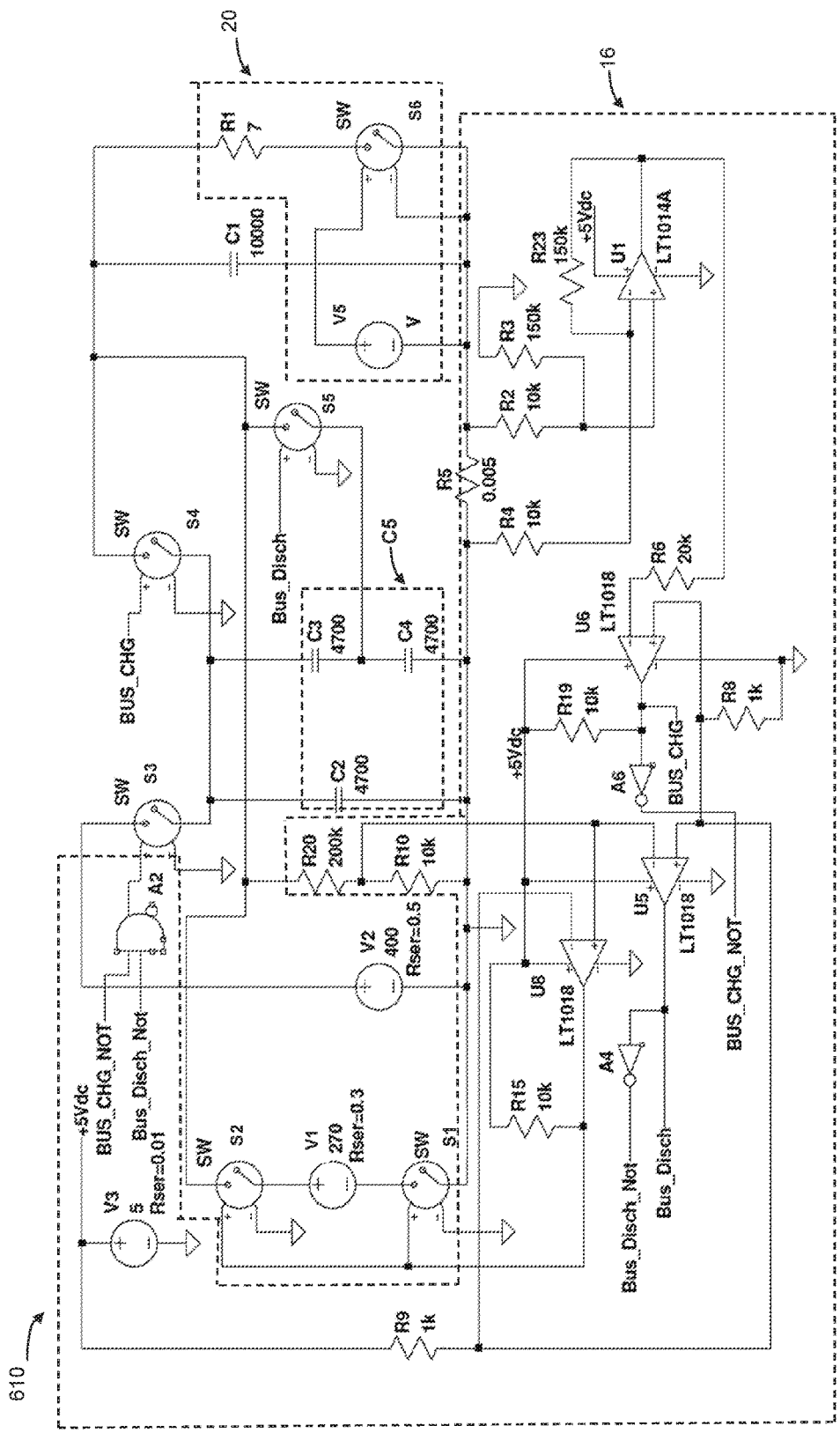
FIG. 12 is an exemplary circuit diagram of an exemplary charge management system according to an embodiment of the invention.

Turning to FIG. 12, an exemplary circuit diagram of a simulated charge management system 610 is shown. In the illustrated embodiment of FIG. 12, the same reference numerals are used to denote structures in the charge management system 610 that correspond to the same or similar structures in the charge management system 10. In addition, the foregoing description of the charge management system 10 is equally applicable to the charge management system 610, and it will be appreciated that aspects of the charge management systems 10, 610 may be substituted for one another or used in conjunction with one another where applicable.

As shown in FIG. 12, the charge management system 610 includes a primary power source V1, a primary power bus capacitor C1, and primary power relay switches S1 and S2 for operably coupling the primary power source V1 to a load 20, which in the simulated circuit 610 is shown as voltage source V5, switch S6, and resistor R1. The charge management system 610 also includes an energy source V2; at least one energy storage capacitor C5, which includes energy storage capacitors C2, C3, and C4; an energy storage capacitor charge switch S3; an energy storage capacitor discharge switch S4; and an energy capture charge switch S5.

The charge management system 610 also includes a system controller 16, which is shown as circuitry in the illustrated embodiment. The system controller 16 includes a voltage source V3; an AND gate A2; resistors R9, R10, R20, R2, R3, R4, R5, R23, R6, R8, R10, and R15; an operational amplifier U1; inverters A6 and A4; and comparators U6, U5, and U8.

As described hereinabove, an exemplary charge management system includes a power distribution bus circuit for distributing energy from a power source to a load, and an intermediate energy storage circuit operably connected to a power distribution bus circuit for aiding in distribution of energy to the load. A charge management system controller may be configured to control the discharge of energy between the intermediate storage circuit and the power distribution bus circuit during one or more modes. Such a charge management system may enable the power distribution bus circuit to receive energy from the intermediate energy storage circuit before the power bus voltage drops in response to load demand, which may enable the power source to respond to perturbations in the power bus voltage and minimize inrush current from the power source. The system also may be used to soft-start high-power equipment, allow regenerative energy storage, and/or absorb energy spikes associated with shut-down of such high-power equipment, among other considerations.

According to one aspect of the invention, a method of operating a charge management system for distributing power from a power source to a load, the charge management system including a power distribution bus circuit operably connected to the power source and the load, and an intermediate energy storage circuit operably connected to the power distribution bus circuit, the method including: (i) charging at least one energy storage capacitor in the intermediate energy storage circuit; (ii) activating a discharge switch to operably connect the at least one energy storage capacitor to at least one power bus capacitor in the power distribution bus circuit, thereby discharging at least some energy stored in the energy storage capacitor to the at least one power bus capacitor; (iii) deactivating the discharge switch to operably disconnect the at least one energy storage capacitor from the at least one power bus capacitor; and (iv) determining whether voltage across the at least one power bus capacitor is within a predetermined range; wherein, when voltage across the at least one power bus capacitor is not within the predetermined range during the determining, then repeating steps (i) through (iv); and wherein, when voltage across the at least one power bus capacitor is within the predetermined range during the determining, then operably connecting the power source to the load.

Embodiments of the invention may include one or more of the following additional features separately or in combination.

The deactivating the discharge switch may be based upon a determination that the at least one energy storage capacitor and the at least one power bus capacitor are within a predetermined range.

The at least one energy storage capacitor may be charged by activating an energy storage capacitor charge switch to operably connect the at least one energy storage capacitor to at least one energy source.

The at least one energy source may be different from the power source.

The charging the at least one energy storage capacitor may include charging to a predetermined level.

After charging the at least one energy storage capacitor to the predetermined level, the method may further include deactivating the energy storage capacitor charge switch to operably disconnect the at least one energy storage capacitor from the at least one energy source.

According to another aspect of the invention, a method of operating a charge management system for distributing power from a power source to a load, the charge management system including a power distribution bus circuit operably connected to the power source and the load, and an intermediate energy storage circuit operably connected to the power distribution bus circuit, the method including: (i) operably connecting the power source to the load; (ii) charging at least one energy storage capacitor in the intermediate energy storage circuit; (iii) determining load current demand, and based upon a determination that the load demands current that meets or exceeds a predetermined level, activating a discharge switch to operably connect the at least one energy storage capacitor in the intermediate energy storage circuit to at least one power bus capacitor in the power distribution bus circuit, thereby discharging at least some energy stored in the energy storage capacitor and at least some energy stored in the power bus capacitor to the load; (iv) deactivating the discharge switch to operably disconnect the at least one energy storage capacitor from the at least one power bus capacitor; and (v) repeating steps (ii) through (iv).

Embodiments of the invention may include one or more of the following additional features separately or in combination.

The deactivating the discharge switch may be based upon a determination that the at least one energy storage capacitor and the at least one power bus capacitor are within a predetermined range.

The at least one energy storage capacitor may be charged by activating an energy storage capacitor charge switch to operably connect the at least one energy storage capacitor to at least one energy source.

The at least one energy source may be different than the power source.

During the charging the at least one energy storage capacitor, the method may further include determining when the voltage across the at least one energy storage capacitor is within a predetermined range.

The activating the discharge switch to operably connect the at least one energy storage capacitor to the at least one power bus capacitor may be based upon a determination that the voltage across the at least one energy storage capacitor is within the predetermined range.

The at least one energy storage capacitor may include a first energy storage capacitor, a second energy storage capacitor, and a third energy storage capacitor.

The second and third energy storage capacitors may be operably connected in series with each other.

The first energy storage capacitor may be operably connected in parallel with the second and third energy storage capacitors.

When the discharge switch is activated, energy stored in the respective first, second, and third energy storage capacitors may be instantaneously discharged to the load, thereby causing an increase in output voltage, current applied to the load, and current the being sourced by the primary power source.

The method may further include determining voltage across the at least one power bus capacitor in the power distribution bus circuit, and based upon a determination that the voltage across the at least one power bus capacitor is greater than a predetermined level, activating a capture charge switch to operably connect the at least one power bus capacitor to the at least one energy storage capacitor, thereby discharging at least some energy stored in the at least one power bus capacitor to the at least one energy capture capacitor.

The at least one energy storage capacitor may include a first energy storage capacitor and a second energy storage capacitor in series with each other, the respective first and second energy storage capacitors being configured to capture the energy discharged from the at least one power bus capacitor when the capture charge switch is activated.

The method may further include deactivating the capture charge switch to operably disconnect the at least one power bus capacitor from the at least one energy storage capacitor.

The deactivating the capture charge switch may be based upon a determination that the at least one energy storage capacitor and the at least one power bus capacitor are within a predetermined range.

The method may further include determining when a shutdown command signal has been received, and based upon a determination that the shutdown command signal has been received, deactivating the energy storage capacitor charge switch, and activating the discharge switch, thereby discharging the at least one energy storage capacitor and the at least one power bus capacitor.

According to another aspect of the invention, a method of operating a charge management system for distributing power from a power source to a load, the charge management system including a power distribution bus circuit operably connected to the power source and the load, and an intermediate energy storage circuit operably connected to the power distribution bus circuit, the method including: (i) determining voltage across at least one a power bus capacitor in the power distribution bus circuit, and based upon a determination that the voltage across the at least one power bus capacitor is greater than a predetermined level, activating a capture charge switch to operably connect the at least one power bus capacitor to at least one energy storage capacitor in the intermediate energy storage circuit, thereby discharging at least some energy stored in the at least one power bus capacitor to the at least one energy storage capacitor; (ii) deactivating the capture charge switch to operably disconnect the at least one power bus capacitor from the at least one energy storage capacitor; (iii) further charging the at least one energy storage capacitor in the intermediate energy storage circuit based upon a determination that the voltage across the at least one energy storage capacitor is below a predetermined level; (iii) determining load current demand, and based upon a determination that the load demands current that meets or exceeds a predetermined level, activating a discharge switch to operably connect the at least one energy storage capacitor to the at least one power bus capacitor, thereby discharging at least some energy stored in the energy storage capacitor and at least some energy stored in the power bus capacitor to the load; and (iv) deactivating the discharge switch to operably disconnect the at least one energy storage capacitor from the at least one power bus capacitor.

Embodiments of the invention may include one or more of the following additional features separately or in combination.

The at least one energy storage capacitor in the intermediate energy storage circuit may include a first energy storage capacitor, a second energy storage capacitor, and a third energy storage capacitor.

The second and third energy storage capacitors may be operably connected in series with each other, and the first energy storage capacitor may be operably connected in parallel with the second and third energy storage capacitors.

When the capture charge switch is activated to operably connect the at least one power bus capacitor to the at least one energy storage capacitor, at least some energy stored in the at least one power bus capacitor may be discharged to the second and third energy storage capacitors.

The further charging the at least one energy storage capacitor may include activating an energy storage capacitor charge switch to operably connect the first energy storage capacitor to at least one energy source that is different from the power source.

When the discharge switch is activated, energy stored in the respective first, second, and third energy storage capacitors and energy stored in the at least one power bus capacitor may be discharged to the load.

According to another aspect of the invention, a charge management system for distributing power from a power source to a load via a power distribution bus circuit having at least one power bus capacitor, the charge management system includes: an intermediate energy storage circuit operably connected to the power distribution bus circuit, the intermediate energy storage circuit having at least one energy storage capacitor, and at least one discharge switch configured to operably connect or disconnect the at least one energy storage capacitor to or from the at least one power bus capacitor; and a system controller operably connected to the power bus distribution circuit and the intermediate energy storage circuit.

Embodiments of the invention may include one or more of the following additional features separately or in combination.

For example, the system controller may be configured to carry out one or more of the aforementioned method steps.

For example, in a start-up mode, the system controller may be configured to: (i) activate an energy storage capacitor charge switch to operably connect the at least one energy storage capacitor to at least one energy source, thereby enabling charging of the at least one energy storage capacitor; (ii) activate a discharge switch to operably connect the at least one energy storage capacitor to the at least one power bus capacitor, thereby enabling discharging of at least some energy stored in the energy storage capacitor to the at least one power bus capacitor; (iii) deactivate the discharge switch to operably disconnect the at least one energy storage capacitor from the at least one power bus capacitor; and (iv) determine whether the voltage across the at least one power bus capacitor is within a predetermined range, such that, based upon a determination that the voltage across the at least one power bus capacitor is not within the predetermined range, the controller is configured to repeat steps (i) through (iv), and based upon a determination that the voltage across the at least one power bus capacitor is within the predetermined range during the determining, the controller is configured to activate a power relay switch to operably connect the power source to the load.

In an operational mode, the system controller may be configured to: (i) operably connect the power source to the load; (ii) determine whether the voltage across the at least one energy storage capacitor is at or above a predetermined level, and based upon a determination that the voltage across the energy storage capacitor is below the predetermined level, the controller is configured to activate the energy storage capacitor charge switch to operably connect the at least one energy storage capacitor to the at least one energy source, thereby enabling charging of the at least one energy storage capacitor; (iii) determine load current demand, and based upon a determination that the load demands current that meets or exceeds a predetermined level, activating the discharge switch to operably connect the at least one energy storage capacitor to the at least one power bus capacitor, thereby enabling discharging of at least some energy stored in the energy storage capacitor and at least some energy stored in the power bus capacitor to the load; and (iv) deactivating the discharge switch to operably disconnect the at least one energy storage capacitor from the at least one power bus capacitor.

In a regenerative mode, the controller may be configured to determine voltage across the at least one a power bus capacitor, and based upon a determination that the voltage across the at least one power bus capacitor is greater than a predetermined level, the controller is configured to activate a capture charge switch to operably connect the at least one power bus capacitor to the at least one energy storage capacitor, thereby enabling discharging of at least some energy stored in the at least one power bus capacitor to the at least one energy storage capacitor.

The at least one energy storage capacitor may include a first energy storage capacitor, a second energy storage capacitor, and a third energy storage capacitor.

The second and third energy storage capacitors may be operably connected in series with each other across the intermediate energy storage circuit, and the first energy storage capacitor may be operably connected in parallel with the second and third energy storage capacitors.

In the operational mode, the controller may be configured to activate the energy storage capacitor charge switch to operably connect the first energy storage capacitor to the at least one energy source, thereby enabling charging of the first energy storage capacitor.

In the regenerative mode, the controller may be configured to activate the capture charge switch to operably connect the at least one power bus capacitor to the second and third capacitors, thereby enabling at least some energy stored in the at least one power bus capacitor to be discharged to the second and third energy storage capacitors.

The controller may be configured to activate the discharge switch, thereby enabling energy stored in the respective first, second, and third energy storage capacitors and energy stored in the at least one power bus capacitor to be discharged to the load.

In the exemplary flow diagrams of FIGS. 2, 5, 7 and 9 described above, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques. In exemplary embodiments, methodologies are implemented as processor executable instructions or operations provided by a controller or on a computer-readable medium. Thus, in one example, a computer-readable medium may store processor executable instructions operable to perform a method. It is further understood that while FIGS. 2, 5, 7 and 8 illustrate various actions occurring in serial, it is to be appreciated that various actions illustrated in these embodiments could occur substantially in parallel.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use.

An "operable connection," as used herein, or a connection by which entities are "operably connected" or are "operably coupled," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Computer program," as used herein, (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners. Software, whether an entire system or a component of a system, may be embodied as an article of manufacture and maintained or provided as part of a computer-readable medium.

It is understood that embodiments of the subject matter described in this specification can be implemented in combination with digital electronic circuitry, or computer software, firmware, or hardware. Embodiments of the subject matter described in this specification can be implemented in a charge management system that uses one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

As discussed above, the system controller 16 encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

Processors encompass all apparatus, devices, and machines suitable for the execution of a computer program include, by way of example, both general and special purpose microprocessors, and any one or more processors of any kind of digital computer. Generally, a processor will receive instructions and data from a read-only memory or a random access memory or both. The essential elements of a computer include a processor for performing instructions and one or more memory devices for storing instructions and data. Generally, a computer will also include, or be operably coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile device or portable storage device (e.g., a universal serial bus (USB) flash drive. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of operating a charge management system for distributing power from a power source to a load, the charge management system including a power distribution bus circuit operably connected to the power source and the load, and an intermediate energy storage circuit operably connected to the power distribution bus circuit, the method comprising:
   (i) operably connecting the power source to the load;
   (ii) charging at least one energy storage capacitor in the intermediate energy storage circuit;
   (iii) determining load current demand at the load, and based upon a determination that the load demands current that meets or exceeds a predetermined level, activating a discharge switch to operably connect the at least one energy storage capacitor in the intermediate energy storage circuit to at least one power bus capacitor in the power distribution bus circuit, thereby discharging at least some energy stored in the at least one energy storage capacitor and at least some energy stored in the at least one power bus capacitor to the load;
   (iv) deactivating the discharge switch to operably disconnect the at least one energy storage capacitor from the at least one power bus capacitor; and
   (v) repeating steps (ii) through (iv).

2. The method according to claim 1, further comprising:
   (i) charging at least one energy storage capacitor in the intermediate energy storage circuit;
   (ii) activating a discharge switch to operably connect the at least one energy storage capacitor to at least one power bus capacitor in the power distribution bus circuit, thereby discharging at least some energy stored in the energy storage capacitor to the at least one power bus capacitor;
   (iii) deactivating the discharge switch to operably disconnect the at least one energy storage capacitor from the at least one power bus capacitor; and
   (iv) determining whether voltage across the at least one power bus capacitor is within a predetermined range;
   wherein, when voltage across the at least one power bus capacitor is not within the predetermined range during the determining, then repeating steps (i) through (iv); and
   wherein, when voltage across the at least one power bus capacitor is within the predetermined range during the determining, then operably connecting the power source to the load.

3. The method according to claim 2, wherein the deactivating the discharge switch is based upon a determination that the at least one energy storage capacitor and the at least one power bus capacitor are within a predetermined range.

4. The method according to claim 2, wherein the at least one energy storage capacitor is charged by activating an energy storage capacitor charge switch to operably connect the at least one energy storage capacitor to at least one energy source that is different from the power source;
   wherein the charging the at least one energy storage capacitor includes charging to a predetermined level; and
   after charging the at least one energy storage capacitor to the predetermined level, deactivating the energy storage capacitor charge switch to operably disconnect the at least one energy storage capacitor from the at least one energy source.

5. The method according to claim 1, wherein the deactivating the discharge switch is based upon a determination that the at least one energy storage capacitor and the at least one power bus capacitor are within a predetermined range.

6. The method according to claim 1, wherein the at least one energy storage capacitor is charged by activating an energy storage capacitor charge switch to operably connect the at least one energy storage capacitor to at least one energy source that is different than the power source.

7. The method according to claim 6, further comprising:
   determining when a shutdown command signal has been received, and based upon a determination that the shutdown command signal has been received, deactivating the energy storage capacitor charge switch, and activating the discharge switch, thereby discharging the at least one energy storage capacitor and the at least one power bus capacitor.

8. The method according to claim 6,
   wherein the at least one power bus capacitor is charged by activating at least one power relay switch to operably connect the at least one power bus capacitor to the power source;
   wherein the at least one energy storage capacitor charge switch and the at least one power relay switch are independently operable to charge the respective at least one energy storage capacitor and the at least one power bus capacitor independently of each other; and
   wherein, when the at least one energy storage capacitor and the at least one power bus capacitor are each fully charged, the voltage across the at least one energy storage capacitor is greater than the voltage across the at least one power bus capacitor for discharging a greater amount of energy from the at least one energy storage capacitor to the load than the amount of energy discharged from the at least one power storage capacitor to the load.

9. The method according to claim 8,
   wherein the at least one energy source is operably coupled to the power source to receive energy from the power source.

10. The method according to claim 1,
    wherein, during the charging the at least one energy storage capacitor, determining when the voltage across the at least one energy storage capacitor is within a predetermined range; and
    wherein the activating the discharge switch to operably connect the at least one energy storage capacitor to the at least one power bus capacitor is based upon a determination that the voltage across the at least one energy storage capacitor is within the predetermined range.

11. The method according to claim 1, wherein the at least one energy storage capacitor includes a first energy storage capacitor, a second energy storage capacitor, and a third energy storage capacitor, the second and third energy storage capacitors being operably connected in series with each other, and the first energy storage capacitor being operably connected in parallel with the second and third energy storage capacitors, such that when the discharge switch is activated, energy stored in the respective first, second, and third energy storage capacitors is instantaneously discharged to the load, thereby causing an increase in output voltage, current applied to the load, and current the being sourced by the primary power source.

12. The method according to claim 1, further comprising:
determining voltage across the at least one power bus capacitor in the power distribution bus circuit, and based upon a determination that the voltage across the at least one power bus capacitor is greater than a predetermined level, activating a capture charge switch to operably connect the at least one power bus capacitor to the at least one energy storage capacitor, thereby discharging at least some energy stored in the at least one power bus capacitor to the at least one energy capture capacitor, thereby causing a decrease in output voltage and current being sourced by the primary power source.

13. The method according to claim 12, further comprising:
deactivating the capture charge switch to operably disconnect the at least one power bus capacitor from the at least one energy storage capacitor, wherein the deactivating the capture charge switch is based upon a determination that the at least one energy storage capacitor and the at least one power bus capacitor are within a predetermined range.

14. The method according to claim 1, wherein the at least one energy storage capacitor includes a first energy storage capacitor and a second energy storage capacitor in series with each other, the respective first and second energy storage capacitors being configured to capture the energy discharged from the at least one power bus capacitor when the capture charge switch is activated.

15. The method according to claim 1, further comprising:
(i) determining voltage across at least one a power bus capacitor in the power distribution bus circuit, and based upon a determination that the voltage across the at least one power bus capacitor is greater than a predetermined level, activating a capture charge switch to operably connect the at least one power bus capacitor to at least one energy storage capacitor in the intermediate energy storage circuit, thereby discharging at least some energy stored in the at least one power bus capacitor to the at least one energy storage capacitor;
(ii) deactivating the capture charge switch to operably disconnect the at least one power bus capacitor from the at least one energy storage capacitor;
(iii) further charging the at least one energy storage capacitor in the intermediate energy storage circuit based upon a determination that the voltage across the at least one energy storage capacitor is below a predetermined level;
(iii) determining load current demand, and based upon a determination that the load demands current that meets or exceeds a predetermined level, activating a discharge switch to operably connect the at least one energy storage capacitor to the at least one power bus capacitor, thereby discharging at least some energy stored in the energy storage capacitor and at least some energy stored in the power bus capacitor to the load; and
(iv) deactivating the discharge switch to operably disconnect the at least one energy storage capacitor from the at least one power bus capacitor.

16. The method according to claim 15, wherein the at least one energy storage capacitor in the intermediate energy storage circuit includes a first energy storage capacitor, a second energy storage capacitor, and a third energy storage capacitor, the second and third energy storage capacitors being operably connected in series with each other, and the first energy storage capacitor being operably connected in parallel with the second and third energy storage capacitors;
wherein, when the capture charge switch is activated to operably connect the at least one power bus capacitor to the at least one energy storage capacitor, at least some energy stored in the at least one power bus capacitor is discharged to the second and third energy storage capacitors;
wherein, the further charging the at least one energy storage capacitor includes activating an energy storage capacitor charge switch to operably connect the first energy storage capacitor to at least one energy source that is different from the power source; and
wherein, when the discharge switch is activated, energy stored in the respective first, second, and third energy storage capacitors and energy stored in the at least one power bus capacitor is discharged to the load.

17. A charge management system for distributing power from a power source to a load via a power distribution bus circuit having at least one power bus capacitor, the charge management system comprising:
an intermediate energy storage circuit operably connected to the power distribution bus circuit, the intermediate energy storage circuit having at least one energy storage capacitor, and at least one discharge switch configured to operably connect or disconnect the at least one energy storage capacitor to or from the at least one power bus capacitor; and
a system controller operably connected to the power bus distribution circuit and the intermediate energy storage circuit;
wherein, in an operational mode, the system controller is configured to:
(i) operably connect the power source to the load;
(ii) determine whether the voltage across the at least one energy storage capacitor is at or above a predetermined level, and based upon a determination that the voltage across the energy storage capacitor is below the predetermined level, the controller is configured to activate the energy storage capacitor charge switch to operably connect the at least one energy storage capacitor to the at least one energy source, thereby enabling charging of the at least one energy storage capacitor;
(iii) determine load current demand at the load, and based upon a determination that the load demands current that meets or exceeds a predetermined level, activating the discharge switch to operably connect the at least one energy storage capacitor to the at least one power bus capacitor, thereby enabling discharging of at least some energy stored in the at least one energy storage capacitor and at least some energy stored in the at least one power bus capacitor to the load; and
(iv) deactivating the discharge switch to operably disconnect the at least one energy storage capacitor from the at least one power bus capacitor.

18. The charge management system according to claim 17, wherein, in a regenerative mode, the controller is configured to determine voltage across the at least one a power bus capacitor, and based upon a determination that the voltage across the at least one power bus capacitor is greater than a predetermined level, the controller is configured to activate a capture charge switch to operably connect the at least one power bus capacitor to the at least one energy storage capacitor, thereby enabling discharging of at least some energy stored in the at least one power bus capacitor to the at least one energy storage capacitor.

19. The charge management system according to claim 18, wherein the at least one energy storage capacitor includes a first energy storage capacitor, a second energy storage capacitor, and a third energy storage capacitor, the second and third energy storage capacitors being operably connected in series with each other across the intermediate energy storage circuit, and the first energy storage capacitor being operably connected in parallel with the second and third energy storage capacitors.

20. The charge management system according to claim 19,
- wherein, in the operational mode, the controller is configured to activate the energy storage capacitor charge switch to operably connect the first energy storage capacitor to the at least one energy source, thereby enabling charging of the first energy storage capacitor; and
- wherein, in the regenerative mode, the controller is configured to activate the capture charge switch to operably connect the at least one power bus capacitor to the second and third capacitors, thereby enabling at least some energy stored in the at least one power bus capacitor to be discharged to the second and third energy storage capacitors;
- wherein the controller is configured to activate the discharge switch, thereby enabling energy stored in the respective first, second, and third energy storage capacitors and energy stored in the at least one power bus capacitor to be discharged to the load.

* * * * *